(12) United States Patent
Gurin

(10) Patent No.: US 12,379,699 B1
(45) Date of Patent: Aug. 5, 2025

(54) FEEDFORWARD DYNAMIC MULTIFUNCTIONAL STRUCTURE WITH DISTRIBUTED ENERGY STORAGE SYSTEM

(71) Applicant: Michael Gurin, Glenview, IL (US)

(72) Inventor: Michael Gurin, Glenview, IL (US)

(73) Assignee: Michael Gurin, Glenview, IL (US)

( * ) Notice: Subject to any disclaimer, the term of this patent is extended or adjusted under 35 U.S.C. 154(b) by 420 days.

(21) Appl. No.: 18/085,573

(22) Filed: Dec. 21, 2022

Related U.S. Application Data

(63) Continuation-in-part of application No. 17/308,902, filed on May 5, 2021, now Pat. No. 11,695,276.

(51) Int. Cl.
*G05B 19/042* (2006.01)
*H02J 3/38* (2006.01)

(52) U.S. Cl.
CPC ............ *G05B 19/042* (2013.01); *H02J 3/381* (2013.01); *G05B 2219/25011* (2013.01)

(58) Field of Classification Search
CPC ......... G05B 19/042; G05B 2219/25011; H02J 3/381
USPC .......................................................... 700/291
See application file for complete search history.

(56) References Cited

U.S. PATENT DOCUMENTS 11,605,975 B1 * 3/2023 Gurin .................... H02J 50/005
11,677,240 B2 * 6/2023 Lu .......................... G06Q 50/40
700/291

* cited by examiner

*Primary Examiner* — Michael J Brown

(57) ABSTRACT

A system and method for reconfiguring physical space having structural integrity, notably empowered by leveraging energy distribution that further leverages dynamic feedforward allocation of distributed energy storage, to maximize space utilization factor to accelerate return on investment, reduce system energy consumption, and maximize functional utilization of physical space particularly suited for modular construction with integral and approximately continuous updating of digital twin modeling to empower higher precision feedforward and feedback systems control resulting in high-performance buildings.

20 Claims, 11 Drawing Sheets

Fig. 3 top view

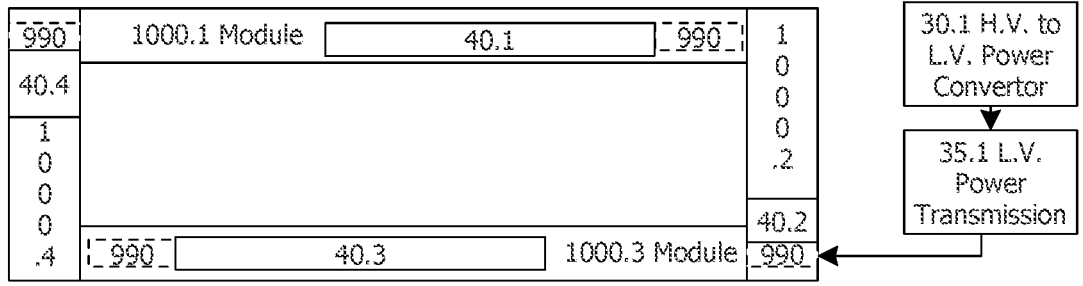

interior side view

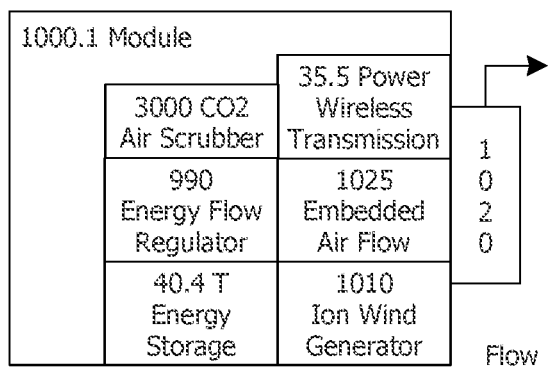

Types of 1000 Modules
Ballasted Furniture
Wall Panel or Pocket Door
Nested Seat or Table
Ballasted Light Fixture or Speaker

Parameters of 990.1
Flow Rate
Threshold - Electrical - Current or Voltage
Threshold - Thermal - Temperature or Flow Pathway Rating - Electrical Wire - Current or Voltage
Pathway Rating - Thermal - Temperature or Pressure component and flow view

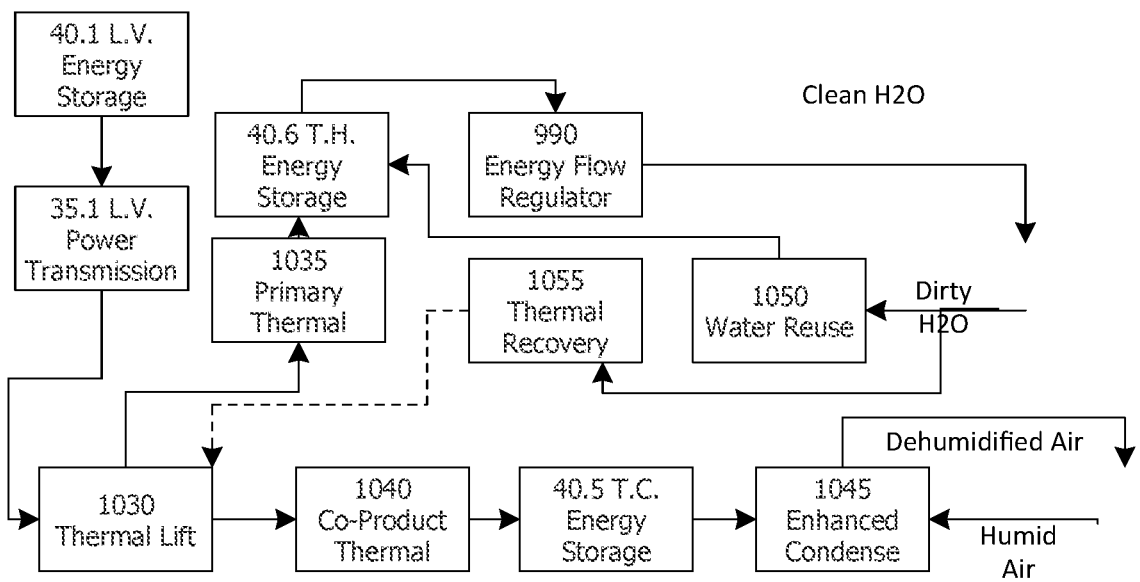

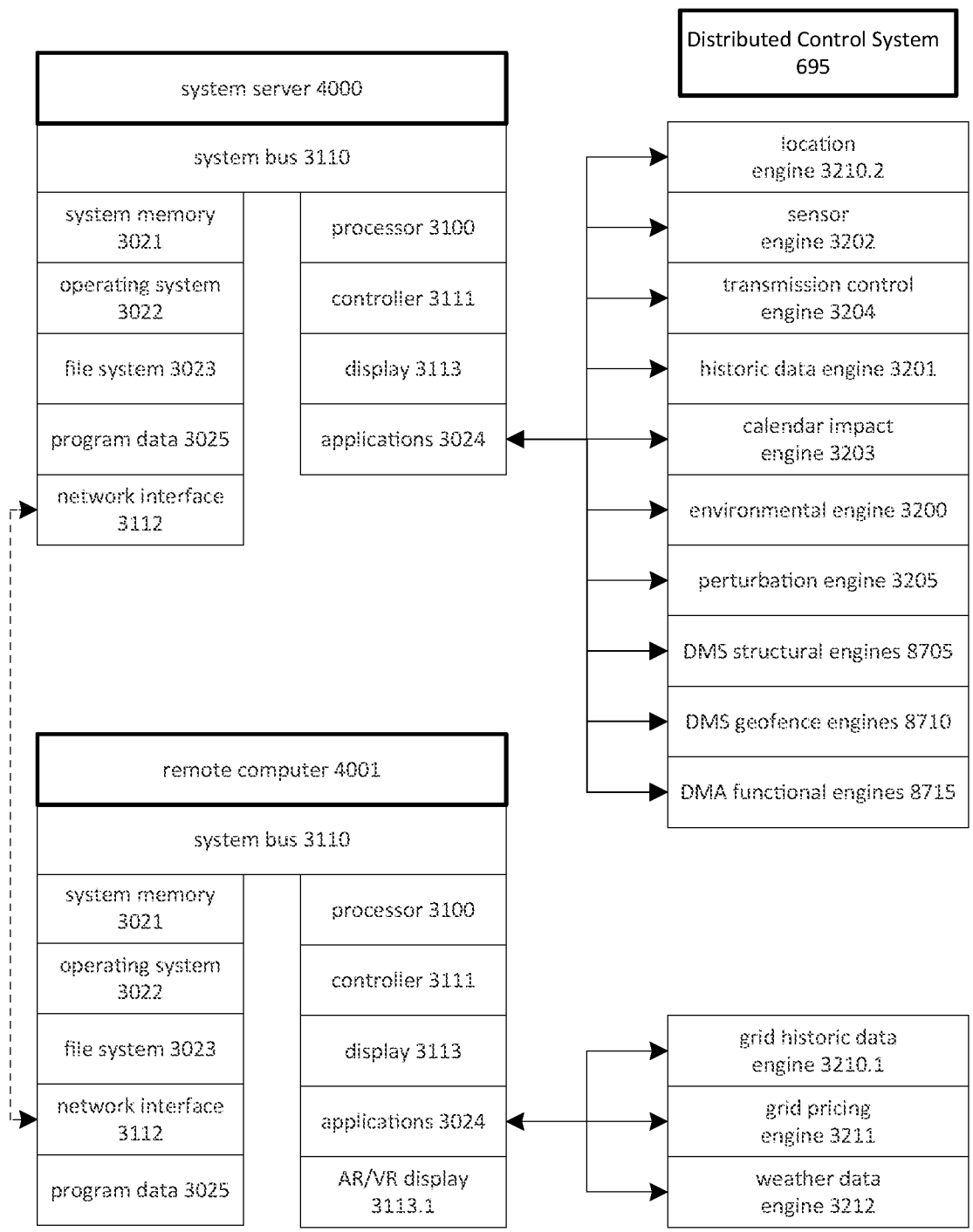

FEEDFORWARD DYNAMIC MULTIFUNCTIONAL STRUCTURE WITH DISTRIBUTED ENERGY STORAGE SYSTEM

CROSS-REFERENCES

This patent application claims priority to and is also a Continuation-In-Part of U.S. patent application Ser. No. 17/308,902 titled "Feedforward Dynamic and Distributed Energy Storage System" on May 5, 2021, the content of which is incorporated by reference.

INVENTION SPECIFICATION

This patent document contains material subject to copyright protection. The copyright owner, also the inventor, has no objection to the reproduction of this patent document or any related materials, as they appear in the files of the Patent and Trademark Office of the United States or any other country, but otherwise reserves all rights whatsoever.

BACKGROUND OF INVENTION

Prior art includes virtually the entire field of built environment where both the internal infrastructure, including power, water, air quality, temperature and humidity control, and lighting, is engineered and designed to meet worst-case scenarios otherwise known within the air conditioning and heating area as design-days. This leads to a low utilization factor of infrastructure, excess engineering, overdesign, and higher upfront capital costs (and typically also higher operating costs, even when variable load capabilities exist), and ultimately a rigidity that limits the capability to reconfigure form and function of a physical space within the building. Infrastructure further restricts buildings in their capability to be modified over the lifetime of the building, let alone largely impossible to vary substantially the function of a building throughout its normal operating cycle.

Prior art includes the stationary placement of energy storage system(s) within a utility electric grid or within buildings for decoupling power generation from power consumption, such as in particular the creation of intermittent renewable energy (e.g., solar, wind) producers. The integration of particularly solar panels into buildings of all types are done solely in an incremental manner along with the energy storage system. This method has minimal impact in reducing the costs of total building systems, in fact in all cases the total building system cost is higher with the energy storage system than without it.

Prior art within modular construction, as well as 3d-printed buildings, are particularly sensitive to the cost of energy interconnects (e.g., electricity, hot-water, cold-water, etc.). The high-peak demand of energy consumers leads to substantially over-sizing of virtually all energy production and transmission equipment, that leads to a corresponding increase in upfront capital costs having a bigger impact in modular construction though in fact in virtually all types of building construction.

Additional prior art within the built environment is rigid placement of environmental (e.g., humidity, temperature, and air cleanliness), lighting, and fluid systems followed by rigid control methods as previously dictated by rigid piping including electrical conduit for electricity consuming systems. Air conditioning, heat pump, and dehumidifier systems in particular have significant constraints due to evaporator and condensor having opposite thermal impact (i.e., cold and hot respectively) in which concurrent dissipation in the same physical space severely limits system effectiveness.

Other prior art includes solely distributed stationary energy storage systems in which the charging and discharging takes place at the same location and therefore solely realizes the time differential between peak and off-peak rate structures without having any secondary benefits or increase in utilization factors. In fact, this scenario doesn't even bypass the distribution lines of the traditional energy distribution components therefore leading predominantly to a traditional once a day peak to off-peak offset.

Advances in technology have changed the way construction can take place, such as a shift to modular and prefabricated assembly though it is almost exclusively structural in nature. However, the design of buildings has not changed substantially to truly leverage and take advantage of energy distribution advances such as advance energy storage, wireless power, and other advance materials and solid-state electronics capabilities. Therefore, modular construction has only incrementally reduced the cost of construction and systems leveraging the new technologies have increased the capital cost of the total system solution rather than reduce capital costs.

A need for an energy storage system that greatly enhances load-balancing WHILE reducing system installed capital costs and reducing the operating costs of energy consumption is required to accelerate the adoption of energy efficiency measures and further accelerate the implementation of renewable energy and reduced environmental footprint of modular construction well beyond the existing adoption rate.

There is also a need to reduce the static design specification (i.e., baseload) and to design systems for roaming and/or reconfigurable dynamic design assets specification "dynamic movable assets" or "DMA". There is a need for a feedforward control system to distribute and reconfigure the DMA based on predicted, projected, or precisely scheduled operational tasks occurring within the structure (i.e., in structural communications to a dynamic multifunction structure "DMS") therefore the DMA is a Primary DMA. There is also a need for a feedforward control system to also schedule additional DMA "Secondary DMA" to support external operational tasks "External Task" to leverage spare capacity from the static design specification.

Finally, there is a need to maximize space utilization and system capacity to overcome the large, embodied carbon dioxide footprint associated with the built environment and land availability constraints particularly in urban-dense locations.

FIELD OF INVENTION

The present invention particularly builds upon a roaming and reconfigurable energy storage system to break the fixed infrastructure paradigm that plagues the built environment, whether the energy is electrical or thermal, with coordinated charging and discharging via a feedforward control system through at least energy flow pathways to minimize system installed cost while maximizing energy efficiency. The implementation of the inventive system is empowered by distributed non-stationary and reconfigurable assets deployed within the built environment and of particular importance in modular construction, 3d-printed buildings, hyper-energy efficient buildings, and low embodied carbon buildings through high infrastructure utilization factors.

BRIEF SUMMARY OF INVENTION

The present invention is a distributed and decoupled dynamic multifunction structure "DMS" that further includes a distributed and decoupled energy storage system, in most instances, from both a first power transmission for power delivery from local power generating sources and remote power generating sources whether the remote sources are in relatively close proximity as a micro-grid or in a centralized utility within a modular system (typically a building though also anticipated as a non-stationary vehicle as well) optimized to reduce upfront capital costs through a series of high energy consumers having directly coupled energy storage devices within a second energy pathway isolated from the first energy pathway where the energy consumer has an integral power regulator (or immediately external of the integral power regulator) that blends the power supply from both the first and second energy pathway concurrently.

Another object of the invention is to minimize the levelized cost of energy where the installation of a modular building has a substantially reduced energy transmission capital cost and installation cost by downsizing the energy transmission pathway power rating by leveraging the strategic and distributed placement of energy storage devices with high peak demand energy consumers (and not inherently located with energy consumers having high energy consumption).

Yet another object of the invention is to enable easy access to energy storage devices by integrating the energy storage devices with pocket doors or swinging doors hidden by covers with integral directional air flow in which ion wind generators leverage the high surface area of the energy storage devices to maximize convective heat transfer yet remaining virtually silent due to the lack of mechanical air flow methods.

Another object of the invention is to co-locate energy recovery devices, as well as water recovery devices, to both increase energy efficiency and decrease energy flow through the segmented energy transmission pathway.

A further object of the invention is to minimize the initial embodied carbon dioxide "CO2" footprint of the modular building while incrementally decreasing both energy consumption directly while sequestering CO2 from atmospheric air. Standalone CO2 removal from atmospheric air has no payback without subsidy or taxation, as compared to this embodiment in which removal of CO2 from indoor air enables a direct reduction of makeup fresh air with the accompanied thermal losses due to venting of indoor air due to respiration from breathing beings.

Yet another object of the invention is to embed energy storage within a modular panel increasing the surface area in combination with an intermittent operation of a solid-state ion wind generator to enhance convective air transfer where one of the electrodes of the ion wind generator also serves as a thermal heat spreader for the energy storage device.

Yet another object of the invention is leveraging a feedforward energy transmission controller concurrently with a feedback energy regulator of an energy consumer to leverage the strategic location of decoupled energy storage devices.

Another object of the invention is to use the unique combination of daisy chained modular panels with integral and embedded daisy chained though segmented and isolated yet interconnected energy transmission pathways to reduce cost of modular construction, notably best achieved with low voltage electricity. This is particularly effective when the power is direct current "DC" instead of alternating current "AC", and even more effective when low voltage is implemented.

Another object of the invention is the fundamental advantage of power generating devices placed in the interior of the building concurrent with people (or animal) occupancy as uniquely enabled by hydrogen fueled power generators notably hydrogen fuel cells. In this instance the lack of noise, gaseous emissions, and inherently variable power output at DC current and low voltage is particularly suited for embedding into a reconfigurable DMA.

Another object of the invention is the fundamental advantage of hydrogen generating devices placed (e.g., electrolyzer) in the interior of the building concurrent with people (or animal) occupancy as an exemplary water electrolysis device will generate oxygen as a byproduct of hydrogen.

Yet another object of the invention is a fundamental advantage of the DMS is a higher utilization rate of the inherent structural capacity of the DMS by deploying assets only as needed in current operating conditions, and in accordance to current demand loads, not in accordance with an aggregate of worst-case scenarios otherwise typically used in the design of structures.

Another object of the invention is a higher utilization rate of the dynamically deployed assets used to support otherwise static placement of assets to meet design-day conditions.

Another object of the invention is the effective decoupling of the low-pressure side from the high-pressure side of the thermodynamic cycle within the conditioned space by leveraging energy storage particularly for phase-change energy storage.

Yet another advantage of the invention is a reduction of maximum design electrical current, therefore enabling the utilization of low-voltage wiring within static positioned assets particularly those in structural communication with the host building structure.

Another advantage of the invention is the decoupling of electrical energy storage from the physical infrastructure to maximize system flexibility enabling both the maximization of revenue due to rapid reconfiguration of physical space and cost minimization to reconfigure for tenant turnover.

Yet another object of the invention is to reduce upfront capital infrastructure costs that otherwise demand a design to support worst-case scenario rather than actual demand.

Another object of the invention is to reduce operating costs within a built environment by reconfiguring the physical space through dynamic, repositionable, and multifunctional assets leveraging distributed energy storage.

Yet another object of the invention is to optimize placement of repositionable assets by creating a precise and updated (reflecting present configuration and placement of DMAs) digital twin in combination with a feedforward control system.

Another object of the invention is to utilize vision sensors such as cameras in a multi-modal capacity to support multiple functions including calibration of repositionable asset position (at least placement of transfer ports, and preferably also orientation within the space), occupant presence and movement pathway, as well as personalization of the physical space in which the repositionable assets reside.

An object of the invention is a higher utilization rate of the inherent structural capacity of a dynamic multifunctional structure "DMS".

Another object of the invention is enabling smaller air handling ducting requirements (i.e., fixed) for performance of environmental (e.g., HVAC) functions to extend the capabilities to reconfigure space and deployment of repositionable assets having additional capacity of direct and/or supportive environmental functions.

Yet another object of the invention enabled by dynamically repositionable assets deployed to a non-deterministic position, particularly in the HVAC space is the effective decoupling of the low-pressure side from the high-pressure side of the thermodynamic cycle within the space that the DMA is positioned by leveraging energy storage.

Another object of the invention is a reduction of maximum design current, therefore enabling the utilization of low-voltage wiring within static positioned assets particularly those in structural communication with the host building structure and more specifically wiring not requiring rigid conduit.

Yet another object of the invention is reconfigurable visual indicators onboard of the repositionable asset to adapt to the position and orientation within the physical space indicating safe egress to any occupants within the physical space.

Another object of the invention is reconfigurable visual indicators onboard of the repositionable asset to indicate required movement to the specified position and orientation within the physical space.

All the aforementioned features of the invention fundamentally recognize the distinction of a decoupled energy storage system that leverages the gains realized by integrating in a decentralized manner and providing multiple concurrent suppliers of energy to consumers of energy especially within buildings leveraging modular construction designs.

BRIEF DESCRIPTION OF DRAWINGS

FIG. 3 is a top view depicting multiple interconnected modules, an interior side view within an exemplary module, and a component and flow view detail of a thermal energy storage exemplary system.

FIG. 4 is a communication flow diagram of controller architecture of the modular distributed energy storage system.

DEFINITIONS

Figure 1:
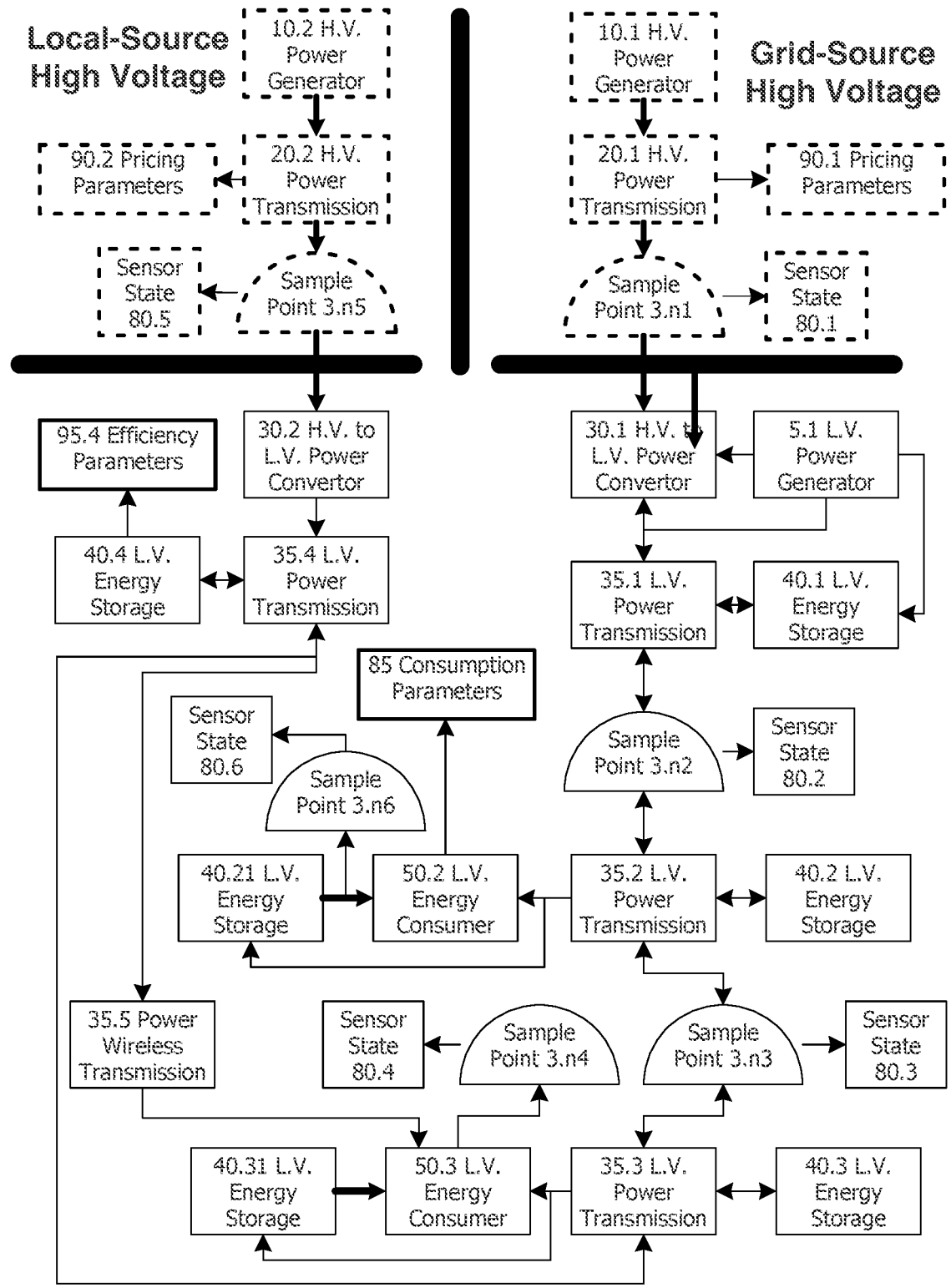
FIG. 1 is an energy flow diagram of the modular distributed energy storage system.

The term "energy storage" is a material that stores energy, whether it be thermal or electrical, such that the primary production of the stored energy form "primary energy" is directed into the energy storage via charging and is subsequently at a non-concurrent time discharged for ultimate end-use consumption of the stored energy subsequent. The transferring of the primary energy as stored energy (i.e., charged media) from the energy storage location to another device to decouple the ultimate consumption of the primary energy at a second location occurs at a "repowering station" hereinafter also abbreviated as "RS". In the instance of thermal energy storage the utilization of phase-change material as the energy storage media has the particular advantage of maximizing the stored energy density.

The term return on investment "ROI", as known in the financial art, is deficient for most energy storage technologies as the payback is too long in comparison to many entities payback threshold as energy storage devices and therefore their payback is limited due to the number of charging and discharging cycles required or able to be provided on a daily basis (and even then most utilities only have a 5-day period in which a peak and off-peak differential occurs).

The term "feedforward and feedback loop control system" is the combination of controlling components (i.e., energy storage components and energy distribution lines) first using a feedforward control system immediately followed by a feedback control system such that control parameters of the feedback control system are a function of the feedforward control system. For clarity, it is understood that the term control system is at least a feedback loop control system and preferably a feedforward and feedback loop control system.

The term "External Task" is a Functional Task that can occur within the structure (i.e., in structural communication) or adjacent to the structure (i.e., adjoining the structure but not in structural communication) in which the Functional Tasks are a task not for any purpose within the structure. An exemplary External Task is a function serving the occupants in their purpose within the DMS though not related to any infrastructure of the DMS that can include logistics of product, food for internal consumption, etc.

The term "Internal Task" is a Functional Task that can occur within the structure (i.e., in structural communication) or adjacent to the structure (i.e., adjoining the structure but not in structural communication) in which the Functional Tasks are a task for any purpose within the structure. An exemplary Internal Task is a function making the DMS safe, comfortable, and effective for occupants to serve their purpose that can include environmental, lighting, power, and safety functions, etc.

The term "Renewal Position" is in the context of an asset that has at least one of its onboard power sources in an at least partially recharged state where renewal increases the energy, volume, or capacity to fulfill its primary mission of performing a functional task beyond the current state prior to renewal.

The term "Functional Task" is at least one specific task that is performed ranging from changing at least one parameter within the geofence where the asset is located including power, energy storage, lighting levels and/or color, temperature, humidity, and air quality.

The term "Transfer Task" is a specialized Functional Task in which at least one specific task is performed ranging from the changing of at least one parameter within the geofence where the asset is located including energy transfer (both electrical or thermal), gaseous transfer (e.g., CO2 desorption, moisture desorption) or logistics transfer (e.g., movement of a product inventory item), which can also include docking to a DMA performing at least one Functional Task within an operating envelope geofence. The method of transfer between two assets takes place in a "Transfer Port", where the transfer port has at least one inlet port (and optionally at least one discharge port) such that the DMA can further carry out its mission beyond the current state of the DMA prior to performing the Transfer Task via the Transfer Port.

The term "Remote Isolation" is in the context of an asset when placed in a remote position from its stationary Renewal Position doesn't have the capabilities to execute any Transfer Tasks.

The term "Remote Dockable" is in the context of an asset when placed in a remote position from its stationary Renewal Position does have capabilities to execute or support at least one Transfer Task.

The term "Dynamic Multifunctional Structure", also referred to as "DMS", is an aggregate of structural components (also collectively referred to as the structural system, building, or standalone structure all used interchangeably) within a structure such that the individual structural components are in structural communication with each other. Due to the dynamic nature of the structural system, it is understood that individual structural components are reconfigured and even repositioned such that structural system provides support of all tributary loads and dead loads attributed to the individual structural components, dynamic multifunction assets, static singular function assets, static multifunctional assets, as well as dynamic singular function assets.

The term "Dynamic Multifunction Asset", also referred to as "DMA", is a functional asset capable of being repositioned within a DMS as determined by the invention to a position (and preferably also with an orientation) in which the asset is projected through a feedforward analysis to successfully accomplish its scheduled functional tasks from a first position determined by the system in which the DMA is moved for at least an operating period (i.e., time) in the future prior to the system determining a next second position. DMAs are of at least two different types of assets being Remote Isolation Asset or Remote Dockable Asset. Walls and furniture are exemplary of multifunctional assets where representative individual functions include a) embedded electrical energy storage, b) embedded thermal energy storage, c) embedded water storage, d) embedded moisture capture (i.e., liquid desiccant or solar adsorbent or air cooling), d) air flow control including emitting vector, flow speed, and inlet vector; e) lighting control including emitting vector, color spectrum, and light intensity. Portable air conditioners, dehumidifiers, light fixtures, power generators are also DMAs, which can be standalone single function devices or embedded/integrated into walls and/or furniture becoming multifunctional DMAs. The fundamental aspect of the portability in the context of this invention is the DMA is largely free of being tethered to stationary infrastructure.

The term "Wireless Power" is in the context of an asset when placed in a remote position from its stationary Renewal Position has the capability to receive via wireless power transmission at least a portion of the electricity required to perform its Functional Task when away from its stationary Renewal Position. The relatively low wattage capacity of existing Wireless Power systems frequently requires on-board electrical energy storage. Energy storage of any type, whether thermal or electrical becomes a relatively heavy asset (i.e., an electric vehicle energy storage weight is a significant weight relative to the vehicle's total weight) and therefore contributes a DMA tributary load and a DMA dead load at its current location and the resulting DMA tributary load and DMA dead load are in structural communications with at least one of the DMS tributary load and the DMS dead load contributing to the aggregate structure's tributary load and dead load. A tributary load, defined and as known in the art, is the accumulation of loads that are directed toward a particular structural member. A dead load, defined and as known in the art, is the weight of the reconfigurable building structure including the weight of fixtures or equipment attached to it and in this embodiment includes the weight of the repositionable assets at the respective then current location.

The term Structurally Safe Geofence is a geofence with a non-linear physical representation, preferably 3-Dimensional but can otherwise be 2-Dimensional, of structural forces that can be safely positioned within the structural system. All structures have spare tributary and dead load capacity between real-time actual loads and design loads. Therefore, there is a need for the DMS to establish a Structurally Safe Geofence for each DMA based on the aggregate of static loads within the geofence as well as summation of every DMA within the same geofence such that the design DMS tributary load and design DMS dead load is never exceeded. The DMS and its further control system components determines placement of DMA first to ensure Structurally Safe Geofence based on tributary loads and dead loads on DMS and then to enable a minimum set of objectives from the group of: a) safe emergency egress, b) effective pathway routing between DMAs within geofence, and c) secondary DMAs particularly executing Transfer Tasks. The inventive Structurally Safe Geofence varies as a function of time due to many variable operations ranging from dynamic and reconfigurable placement of DMAs, varying weather events (notably creating wind and/or snow loads), which drives the necessity for both a feedforward and feedback control system to ensure the structural integrity of the host structure (i.e., building) always (i.e., total structural loads always remain below design load specifications).

DETAILED DESCRIPTION OF THE INVENTION

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

The invention significantly increases the daily cycles of charge/discharge in order to reduce the time duration required to achieve a financial return not only at the component level but most importantly at the system level.

Turning to FIG. 1, FIG. 1 depicts the interconnection within a modular building as well as the external interconnections from a locally co-located "local-source high-voltage" or "LSHV" energy source and/or a centralized (i.e., not co-located) "grid-source high-voltage" or "GSHV" energy source. It is understood that the LSHV can be in close physical proximity such as a power source within the industry accepted term of microgrid or in fact an on-the-building energy source such as rooftop solar panels. It is understood that the GSHV is more typical of a traditional utility supplied power source. Yet in this embodiment the fundamental importance is that multiple concurrent energy feed sources are present, and more importantly due to the fundamental objective of minimizing energy transmission ratings through distributed energy storage with interruptible transmission segments the multiple energy sources are at different ends of the energy transmission pathway. It is further understood, though represented as electricity, the energy transmission pathway is also anticipated to be thermal energy such as via a heat-transfer fluid or a thermal bus.

Beginning at the GSHV 10.1 H.V. power generator provides energy through a 20.1 H.V. power transmission line. The power generator source has 90.1 pricing parameters as known in the art that can range from peak vs. off-peak, real-time, more traditional time of day, or even firm non-dynamic pricing. The energy flow is through a 3.$n1$ sample point providing a 80.1 sensor state (e.g., kW or BTU). Likewise, the LSHV 10.2 H.V. power generator provides energy through a 20.2 H.V. power transmission line. The power generator source has 90.2 pricing parameters as known in the art that can range from peak vs. off-peak, real-time, more traditional time of day, or even firm non-dynamic pricing. The energy flow is through a 3.$n5$ sample point providing a 80.5 sensor state (e.g., kW or BTU).

The GSHV, which when electrical is at a different voltage (and in fact most likely AC, as opposed to DC), the energy source is converted through a 30.1 H.V. power convertor (or when thermal instead of electrical interchanged with a thermal regulator which can be a high-pressure steam to low-pressure steam modulator valve, pressure reducer, or energy generating pressure expander). The same power convertor can regulate directly another connected to a co-located 5.1 L.V. power generator (e.g., a solar panel on a DC bus) though electrically isolated with independent regulation/control as known in the art. Since in this embodiment it is critical to reduce the energy transmission capacity rating, it is a feature of the 5.1 L.V. power generator to directly connect to the 40.1 L.V. energy storage and concurrently isolate all energy flow from the 35.1 L.V. power transmission. Though not shown, it is understood that excess energy generated via 5.1 L.V. power generator (e.g., biofuel powered plant, solar, wind, hydro, etc.) can be sold into the GSHV utility grid or LSHV micro-grid. It is imperative within the inventive system that every segment of the 35.$x$ power transmission system have an 3.$nx$ energy sampling point providing a 80.$x$ sensor state to the 3204 transmission control engine "controller" (as shown on FIG. 2) to regulate/switch both the direction and quantity of energy flowing through and between each of the transmission pathways. A transmission pathway is by definition segmented into individual, though interconnected through isolation regulators/switches also referred to as an isolation connector or isolation switch or isolation point used interchangeably, pathways in which at least one power generator or energy storage source is present such as from 35.1 L.V. power transmission segment to 35.2 L.V. power transmission where a 3.$n2$ sample point provides a 80.2 sensor state (and though not shown in this figure an energy isolation capability between the two segments that modulates energy flow from energy each source including direction of flow. In this instance, the second segment of the 35.2 L.V. power transmission has an 40.2 L.V energy storage within the segment itself capable of providing (as known in the art) directly to the transmission pathway. This same 35.2 L.V. power transmission is directly connected to the 50.2 L.V. energy consumer, such that power in this instance as depicted can come from all interconnected sources (as dynamically available at such time) BUT most importantly as a design feature of the invention from an immediately co-located 40.21 L.V. energy storage device that DOESN'T have any energy flow through any (as shown 35.2 L.V.) power/energy transmission segment. The flow of energy from that isolated and directly connected through a second energy flow pathway to the 50.2 L.V. energy consumer is also regulated by the 3204 transmission control engine (as shown on FIG. 2) as 3.$n6$ sampled through 80.6 energy state. The 3204 transmission control engine has specifications of the 50.2 L.V. energy consumer including 85 consumption parameters (understood to be available for as many energy consumers or aggregated energy consumers as possible) that further include historic, projected, scheduled, and dynamic modeled data-points to ensure that each segment of the power transmission is maintained below its maximum thresholds. As described earlier, each pathway having either a power generator or energy storage capability has regulator at the interconnection point with a 3.$n3$ sampling point providing a 80.3 sensor state (and also respectively 3.$n4$ and 80.4 for 50.3 L.V. energy consumer since the energy consumer has an independently connected energy source transmitted via 35.5 wireless power transmission methods (as known in the art) which by design doesn't use or therefore place a demand on any independently and isolated power transmission methods to the 50.3 L.V. energy consumer. Each energy source to the consumer, even if it is at precisely the same operating voltage, is isolated and independently regulated/constrained to maintain each physical wire of power transmission to below its maximum operating threshold. This embodiment depicts a concurrent wireless and "wired" power source into the 50.3 energy consumer. It is understood as shown that the 35.5 power wireless transmission, though potentially less energy efficient, may draw power from 40.4 L.V. energy storage through a wired 35.4 L.V. transmission segment so as to not place a transmission constraint on the wired pathway (or draw power through one portion of the segmented power transmission, as shown to be 35.4 L.V. sourced ultimately from 10.2 H.V. power generator. Though shown for only 40.4 L.V. energy storage, it is understood that each energy storage device is fully characterized by 95.4 efficiency parameters that include other operating parameters and design limitations such as in-out energy efficiency, maximum charge and discharge rates, cumulative deep discharge cycles, cycle lifetime, operating temperature, and ultimately the levelized cost of energy for each energy storage system (at least that portion attributed to energy flow amortization rate).

Figure 2:
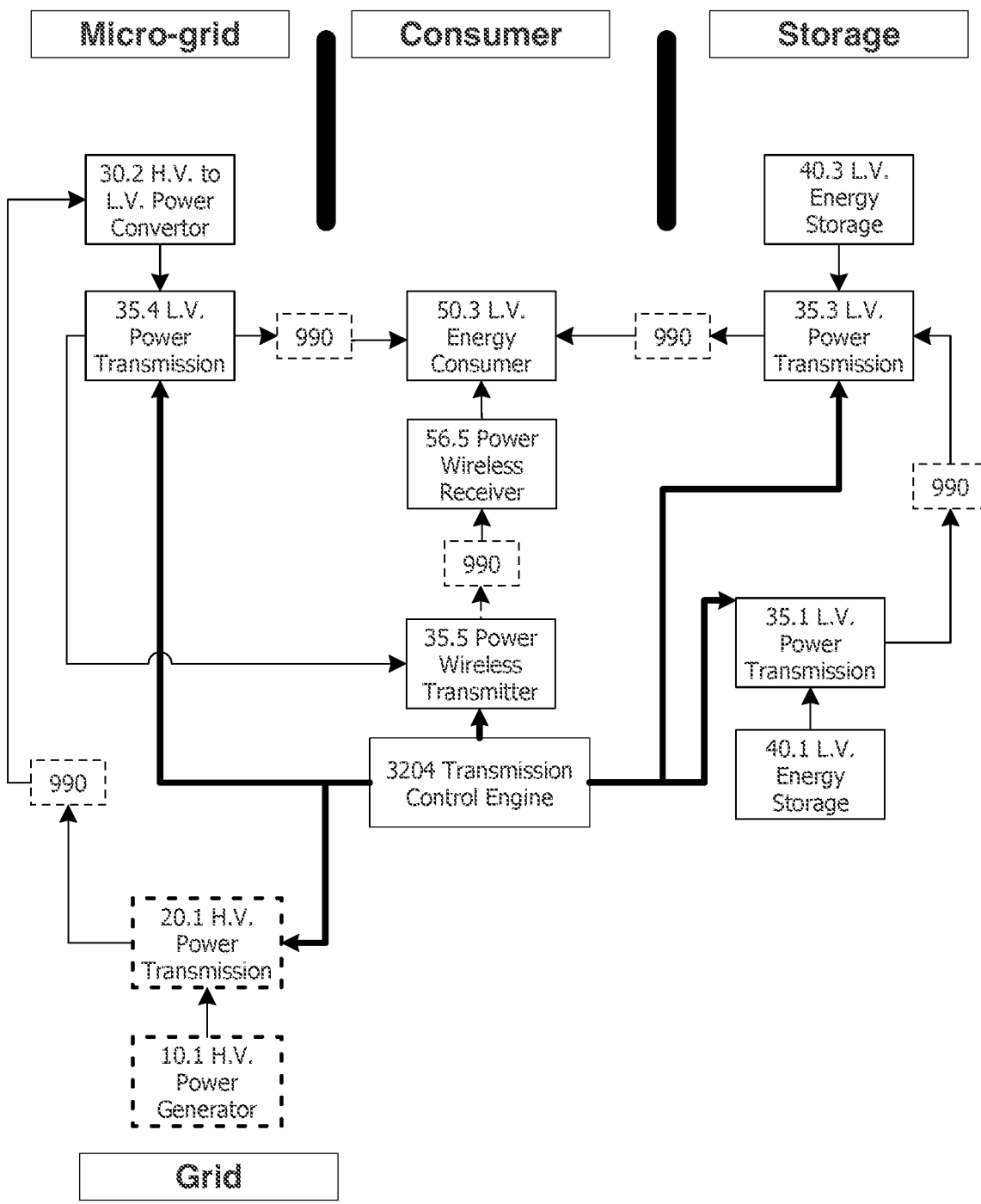
FIG. 2 is also an energy flow diagram with additional detail of multiple energy pathways to the energy consumer.

Turning to FIG. 2, FIG. 2 is a more detailed version of FIG. 3 in which the 990 voltage regulators also with embedded energy circuit isolation and modulated (preferably variable energy flux modulation, though also can be binary open/close) flow regulation. In addition, the 3204 transmission control engine "controller" is in communications (whether it be wired or wireless as known in the art) with each segment of the power transmission (as shown 35.1 L.V., 20.1 H.V., 35.1 L.V., 35.2 L.V., and 35.3 L.V.) via sample points and sensor states (as shown in FIG. 1). As noted earlier, the most important aspect of the invention is the 50.3 L.V. energy consumer has at least two independent, isolated, and regulated energy sources such that each energy source pathway is segmented from the others and that the 3204 controller dynamically modulates the system energy flow with a primary emphasis on maintaining no more than 98% of total consumer energy from an individual wired power transmission (35.4 L.V. or 35.3 L.V.) and preferably no more than 50% of total consumer energy from an individual wired power transmission, and more specifically preferred that the power transmission rated capacity is no more than 20% of the peak power rating of the 50.3 L.V. energy consumer.

The dynamic and distributed energy storage system has virtually all aspects of energy transmission coordinated by a controller. The controller has computer memory, as known in the art, such that at least a portion the memory is non-transitory memory. Memory is utilized to coordinate through a reservation engine individual charge and discharge transactions that are configured, scheduled, and dispatched in a time series interval of at least one charge reservation and at least one discharge reservation for each of the networked individual energy storage devices. The reservation engine also links the individual energy storage devices to at least one energy consumer that is directly co-located or at least in energy communications with at least one energy consumer. The energy storage device can serve multiple concurrent energy consumer devices concurrently or as represented by an aggregate of individual energy consumer devices. In this instance, the reservation engine may not actually be able to differentiate between an individual energy consumer or the aggregate yet the fundamental requirement of maintaining each pathway that energy travels must remain below the maximum threshold.

The network energy storage devices as well as the energy consumer devices are decoupled from an energy producing asset(s) including an at least one energy production generator producing a primary energy source at a first location that is different from the energy storage device. The particularly preferred primary energy source is direct current "DC" when the energy source is electricity, and specifically preferred DC energy source has a low voltage preferably defined as a voltage typically associated with telecommunications voltage and particularly within the geographic standards such that electrical wire doesn't require rigid conduit and doesn't require "home runs" back to a main distribution panel. The preferred embodiment is such that electrical wire is free from wire interconnection restrictions between energy flow regulators. The particularly preferred embodiment is such that electrical wire between each energy flow regulator is isolated from other electrical wires connected to the same energy flow regulator, and likewise the preferred embodiment is identical for each energy consumer such that multiple independent energy pathways are provided to the energy consumer. The inventive system reduces rigid conduit between individual wall panels (i.e., understood to be distinct panels that are assembled on-site within modular housing as known in the art) by at least 20%, preferably by at least 50%, and particularly preferred by at least 80%. The inventive system increases the number of distinct individual panels to be assembled on-site by at least 20%, preferably by at least 50%, and particularly preferred by at least 80% (whereas the current art requires either larger modules occupying more shipping volume, or on-site electrical wiring through rigid conduit with electrical wiring home runs through that rigid conduit thereby increasing the amount of on-site labor and therefore less cost savings) while decreasing empty (i.e., voids) shipping volume of the aggregate of panels of the modular construction (e.g., housing, vertical farms, aquaculture, greenhouse, etc.) by at least 20%, preferably by at least 50%, and particularly preferred by at least 80%. A further advantage and feature of the inventive modular construction is an increase in integral folding structures compactness by at least 20%, preferably by at least 50%, and particularly preferred by at least 80% such that shipping empty space is reduced by at least 20%, preferably by at least 50%, and particularly preferred by at least 80%. The additional use of wireless power between individual wall panels or between individual modules further reduces rigid conduit requirements and in virtually all instances even flexible conduit when the energy being transmitted is electricity. Wireless power in combination with distributed energy storage has a fundamental advantage of reducing exposure to wireless power (i.e., electrical and/or magnetic) fields during actual use of energy consumers (i.e. occupancy of the common space).

As known in the art, the energy storage device is dispatchable such that the primary energy source is capable of being consumed as a function of time independent of its production and capable of being stored in a charged energy storage media within an energy storage inventory (preferably embedded into the 1000 module at a second (and distinct) location from the energy source. The controller operates a program stored in the non-transitory memory for an optimization model to decrease a capacity load factor of the primary energy to less than an at least one energy consumer having a peak energy consumption rating within the decoupled and distributed energy system such that the energy consumer MUST obtain energy from at least two distinct power sources simultaneously such that at least one of the two distinct power sources is from an energy storage system embedded in the 1000 module. In particular, the goal is to reduce the size rating to substantially lower than the aggregate of energy consumers recognizing that the many of the energy consumers individually have low utilization rates. One exemplary is the use of oven within a kitchen of a personal residence. Another exemplary energy consumer device is a washing machine or dishwasher or a shower. Each energy pathway has an energy flow regulator that maintains the flow of energy to always be below the maximum threshold.

The distributed energy system, particularly within a modular decentralized system, minimizes the energy transmission rating of the transmission pathway. More specifically, such as when the form of energy being transmitted is electricity, the energy transmission rating is lower that a rating threshold in which rigid conduit is required within the modular decentralized system. Within the United States as one exemplary rigid conduit is not required when the combination of current rating, power rating, and voltage rating are within the telecommunications power distribution standard (e.g., voltage is less than 48V, wattage is less than 100 watts). When the modular decentralized system is a building comprised of a series of modules or 3d printed structures the energy transmission has substantially lower capital installed costs (i.e., at least 5% lower as compared to rigid conduit, preferably at least 20% lower, and particularly preferred at least 50% lower). The size (i.e., diameter) of the energy transmission pathway (e.g., electric wire, water pipe) has both direct installation cost ramifications as well as structural ramifications (e.g., modular wall or panel thickness, strength of modular wall or panel) and therefore is optimal at a low diameter. Another advantage of telecom power is the use of DC (as compared to AC) power in terms of safety particularly within flooding conditions. The use of DC power eliminates numerous safety standards that then require building safety codes (and thus elimination of energy distribution requirements such as spacing and frequency of electrical plug outlets).

Turning to FIG. 3, FIG. 3 has three views of components within the modular system. The top view depicts the interconnections between individual 1000 modules (sequentially numbered as 1000.1 through 1000.4) such that each module has a 990 energy flow regulator as shown in FIG. 2 and FIG. 3 (and understood to be within FIG. 1 in the same orientation, though not shown due to space constraints) to precisely modulate (and more particularly to limit energy flow to less than the maximum threshold e.g., for electricity being maximum current threshold and maximum voltage threshold; or for thermal maximum temperature and maximum flow rate) the energy flow rate within each module as dictated by the pathway rating (e.g., for electrical of electrical wire current rating and electrical wire voltage rating; or for thermal of thermal bus or pipe temperature rating and pressure rating). It is further understood as shown in FIG. 1 that each 990 energy flow regulator has a transmission pathway 3.$nx$ sample point in which at least one 80.$x$ sensor state is measured. It is a primary benefit of the 1000 module with embedded and integral 40.$x$ energy storage (where x=1 . . . 4 as shown) with each energy storage device having an individual 990 energy flow regulator such that each module then has a distinct energy transmission pathway. As shown, 1000.1 module is interconnected to 1000.2 module then to 1000.3 module and finally 1000.4 module (though it is understood that fewer or more modules are within the scope of the invention). Though not shown in the top view, it is understood that as shown in FIG. 3 interior side view and as within FIG. 1 and FIG. 2, that each module preferably has an integral and embedded 40.$x$ energy storage device. Each module energy transmission pathway that is energy communications with a power source (e.g., 35.1 L.V. power transmission representing a low voltage DC energy source as itself regulated by 30.1 H.V. to L.V. power converter that reduces the voltage as known in the art of DC: DC or AC: DC power convertors) or an energy storage device MUST have a 990 energy flow regulator. The preferred energy flow regulator has at least two energy pathways which are isolated from each other, and particularly preferred to also be capable of bi-directional energy flow. Though not preferred, an energy flow regulator can be a binary flow control (e.g., open or closed) instead of the preferred variable energy flow regulator.

A preferable embodiment has multiple types of modules 1000 integrate the inventive features including furniture, wall panel, pocket door, nested seats, nested tables, light fixtures and speakers. Virtually all these modules further benefit from utilization the energy storage as ballast, particularly when the module leverages lightweight materials as known in the art. Furthermore, the ballasted energy storage is particularly preferred to be contained within the host device when the host device is a wall panel, pocket door, or in general any panelized device such that the thermal load is thermally isolated from the exterior portion of the panelized device. Airflow is particularly preferred to be diverted away from both the exterior portion of the panelized device and importantly also diverted away from the room in which the panelized device is contained within such as shown in this FIG. 3 top view as depicted by either 40.1 or 40.3. Virtually all instances of a ballasted energy storage devices will have the energy storage device below its host device's center of gravity. It is recognized that the combination of the onboard energy storage system serves as ballast thus with exemplary instances of converting an energy consuming asset into a ballasted energy consuming asset, an environmental asset into a ballasted environmental asset or ballasted furniture asset.

Continuing in FIG. 3, the component and flow view depict an exemplary instance where the 1000 module has both 40.6 T.H. thermal and 40.1 L.V. electrical energy storage devices. This embodiment has a series of optional though preferred as optimal components to further minimize energy flow transmission from module to module WHILE significantly reducing energy consumption through thermal energy recovery and particularly preferred through the addition of water-reuse components. In this embodiment the 40.1 L.V. energy storage device provides power through the 35.1 L.V. power transmission to a 1030 heat pump providing temperature lift, as known in the art, to recover waste heat via a 1055 heat exchanger (or heat pipe) obtained from dirty water "H2O". The 1030 heat pump in its optimal configuration provides both heating via 1035 primary thermal output and cooling via 1040 secondary co-product thermal output. Each of these outputs are optimally in energy communications respectively with 40.6 T.H. energy storage and 40.5 T.C. energy storage so that the subsequent utilization of their thermal energy is time decoupled from the operation of the heat pump. A preferred use, though concurrent, of the cooling thermal energy from 40.5 T.C. is for 1045 enhanced condensation of humid air as derived from within a bathroom during a shower. A subsequent in terms of time use of 40.5 T.C. (though not shown) is utilizing the cold thermal energy to provide local air conditioning within the bathroom after the person taking a shower is outside of the bathroom (to ensure comfort). The embedded energy storage within the module closest to the bathroom minimizes energy transmission losses as well as distinctly enables local and independent temperature control to the bathroom (as distinct from the other modules). The utilization of the heat pump in this exemplary scenario enables the energy consumption to be at least 75% lower than without a heat pump due to the concurrent coefficient of performance for the combined cooling and heating circuits. Another embodiment is having 1050 water-reuse device also embedded within the 1000 module. The 1050 water-reuse device is comprised of a polar non-polar membrane separator followed by a high-surface area activated carbon filter such that dirty water then passes directly through the 40.6 T.H. energy storage device to be re-heated to the target temperature thus virtually reusing all of the embedded thermal energy from the dirty water. Having this water-reuse component preferably within the module, but at least within proximity of the energy storage device(s).

Yet another embodiment of distributed storage, though in this instance, the stored content is CO2. A major design consideration in modular construction is centralized air distribution system particularly for maintaining fresh air. This is traditionally done through air ducting, typically done through central air, in which numerous design impacts exist that are averse to modular panels. Interconnections of fresh air "supply" ducts between modular panels, or requiring structural modifications to avoid supply ducting, are best avoided by reducing (or preferably eliminating centralized supply or return) air ducting. This is best accomplished by integrating 3000 $CO_2$ Air Scrubber (as shown in FIG. 3 interior side view) embedded into the modular panel (it is understood that all references to modular panel can be modular wall panels or modular floor panels). Distributed (i.e., decentralized) air scrubber has the concurrent advantage of removing $CO_2$ from the interior air space, thus enabling super-insulated buildings to both reduce energy consumption, but also to reduce modular panel thickness and interconnections. Another embodiment is the utilization of a roaming $CO_2$ air scrubber powered preferably by energy storage batteries or wireless power. An advantage of a roaming scrubber is the ability for the $CO_2$ to be desorbed in a second location, such as in an algae growth chamber or greenhouse, while concurrently reducing or eliminating the centralized air supply or return ducting. In virtually all instances given the distributed nature of the inventive energy storage, air flow for thermal management purposes is best done by a solid-state air flow generator due to its substantially quiet operations. The ion wind generator 1010 is one such solid-state air flow generator as shown. The ion wind generator 1010 can be substituted with virtually any solid-state air flow generator including piezoelectric flexible thin film actuator creating a motion to displace and create air flow (notably to break the boundary layer to increase heat transfer away from the energy storage device).

Turning to FIG. 4, FIG. 4 is a communication flow diagram of controller architecture of the modular distributed and segmented energy storage system. The system has at least one system server 4000 with either integral (though not shown as distinct) or a remote computer(s) 4001 in which a grid historic data engine 3210.1 with a grid pricing engine 3211 and preferably with a weather data engine 3212 such that in the aggregate the feedforward with feedback controller can optimize energy flow in each regulated and switchable energy flow segment.

Both the system server 4000 and remote computer 4001 have a hardware system bus 3110 integrating the system memory 3021 operating an operating system (preferably real-time) 3022 to operate programs stored in a file system 3023 to access program data 3025 as determined by the processor 3100 in conjunction with a controller 3111 (having an optional display 3113 or augmented reality/virtual reality display 3113.1) processing a range of applications 3024. Each isolated segment preferably has a distributed control system 695, though not shown, also has a hardware system bus 3110 integrating the system memory 3021 operating an operating system (preferably real-time) 3022 to operate programs stored in a file system 3023 to access program data 3025 as determined by the processor 3100 in conjunction with a controller 3111 (having an optional display 3113 or augmented reality/virtual reality display 3113.1) processing a range of applications 3024. The inventive feedforward-feedback control system has a location engine 3210.2 that preferably has a geospatial map of each vector and the vectors are in a multi-dimensional space domain (i.e., vector can be in a 2-dimensional or 3-dimensional representation showing relative dimensions or orientation to the other interconnected vectors relative to the energy flow segment) and segment (as depicted in FIG. 6), a sensor engine 3202 reading each connected sensor (notably current and voltage in real-time for at least each vector and segment) as well as leveraging machine learning to establish meta-sensors (i.e., virtual data establishing superior predictive capabilities particularly as the meta-sensor data contains data ranging from weather to calendar impact as obtained from the historic data engine 3201 (including time of day, and preferably time of day overlaid with the other data impact engines) and calendar impact engine 3203 (date specific data such as holiday, day of week, season, etc.) and environmental engine 3200 (data specific to environmental parameters such as allergies, fires, combustion emissions, etc.) all bundled into a decision matrix coordinating energy transmission, energy storage, and energy consumption via the transmission control engine 3204 such that each regulator/switch (not shown 990) and each vector within each segment is precisely coordinated across at least energy flow current and preferably also voltage. The perturbation engine 3205 specifically implements an overlay of historic data with at least one of location engine, calendar impact engine, and environmental engine to establish increasing accuracy of energy consumption of each energy consumer connected to the inventive distributed energy storage system. The resulting system enables a substantially reduced peak current amperage such that the preferred embodiment of enabling a virtual absence of rigid conduit notably within the range of modules 1000 as noted in FIG. 3. The transmission control engine 3204 is a composite control system that regulates segmented energy transmission and is the heart of the feedforward application (as noted in FIG. 5) such that the combination with the perturbation engine 3205 improves the system energy efficiency by at least 5% and preferably by at least 20% over a segmented energy flow system without the combination of the feedforward applications and perturbation engine. The DMS structural engines 8705 is a composite series of structural analysis engines that perform tributary load analysis, tributary load area analysis, and dead load analyst, with the preferred embodiment optimizing for the location placement of repositionable assets. The DMS geofence engines 8710 is a composite series of multi-dimensional analysis in context to the location placement of repositionable assets and their impact within the multi-dimensional space and time variance within each geofence, with the preferred embodiment including a geofence ensuring safe egress, a geofence enabling service repositionable asset traffic corridors that minimize traffic interference with predicted traffic corridors of occupant movement pathways taking into account historic data, predictive preferences, and/or as simply pathway travel distance minimization. The DMA functional engines 8715 is also a composite series of multi-parametric as well as individual parameters optimally in at least a two-dimension analysis and preferably a three-dimension analysis, notably and preferably lighting (including both natural and artificial), temperature, humidity, air cross contamination, fresh air exchange, radiant surface emittance as a function of temperature, noise, etc.

Figure 5:
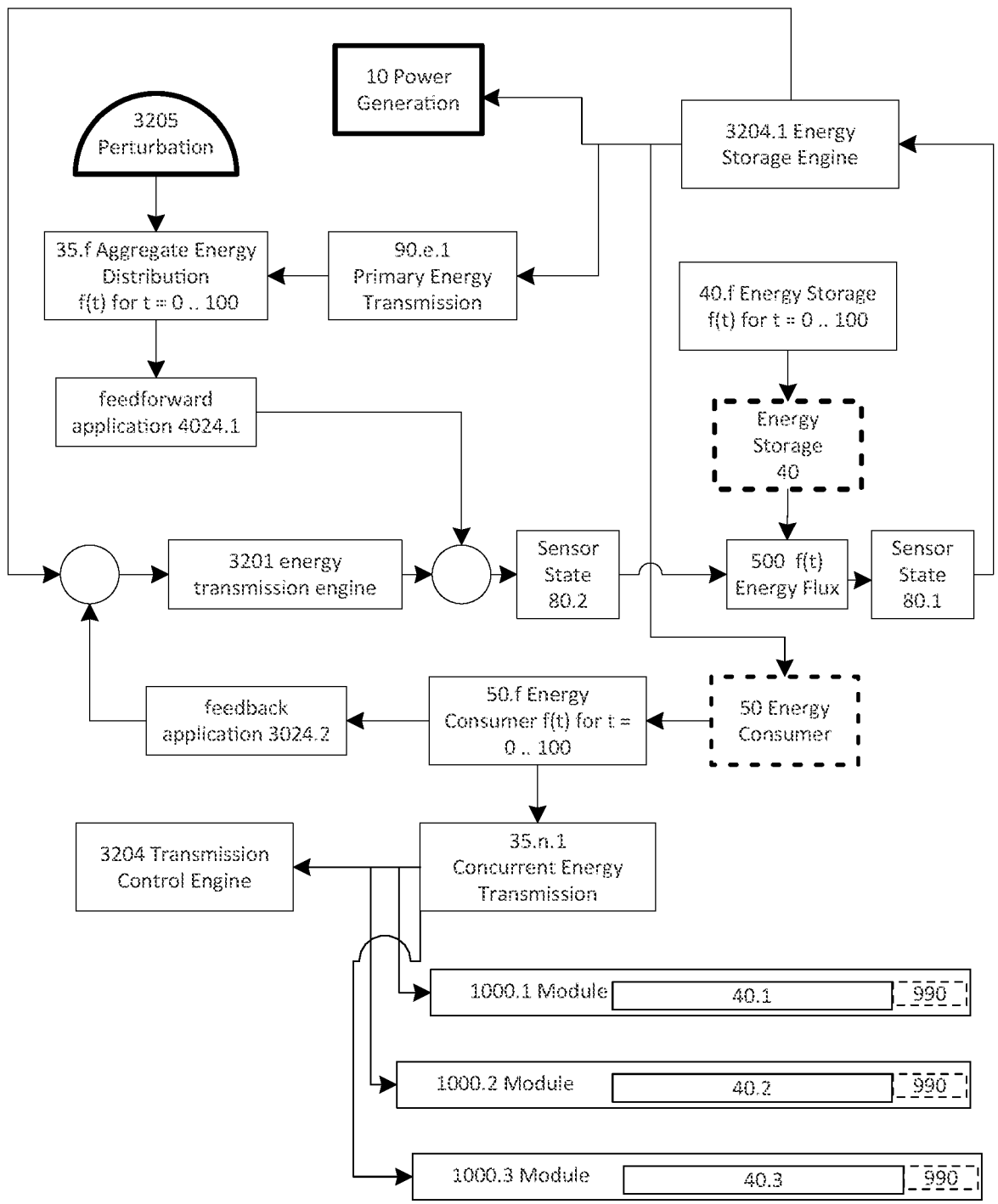
FIG. 5 is a process logic flow diagram of the controller depicting the feedforward with feedback architecture.
Figure 6:
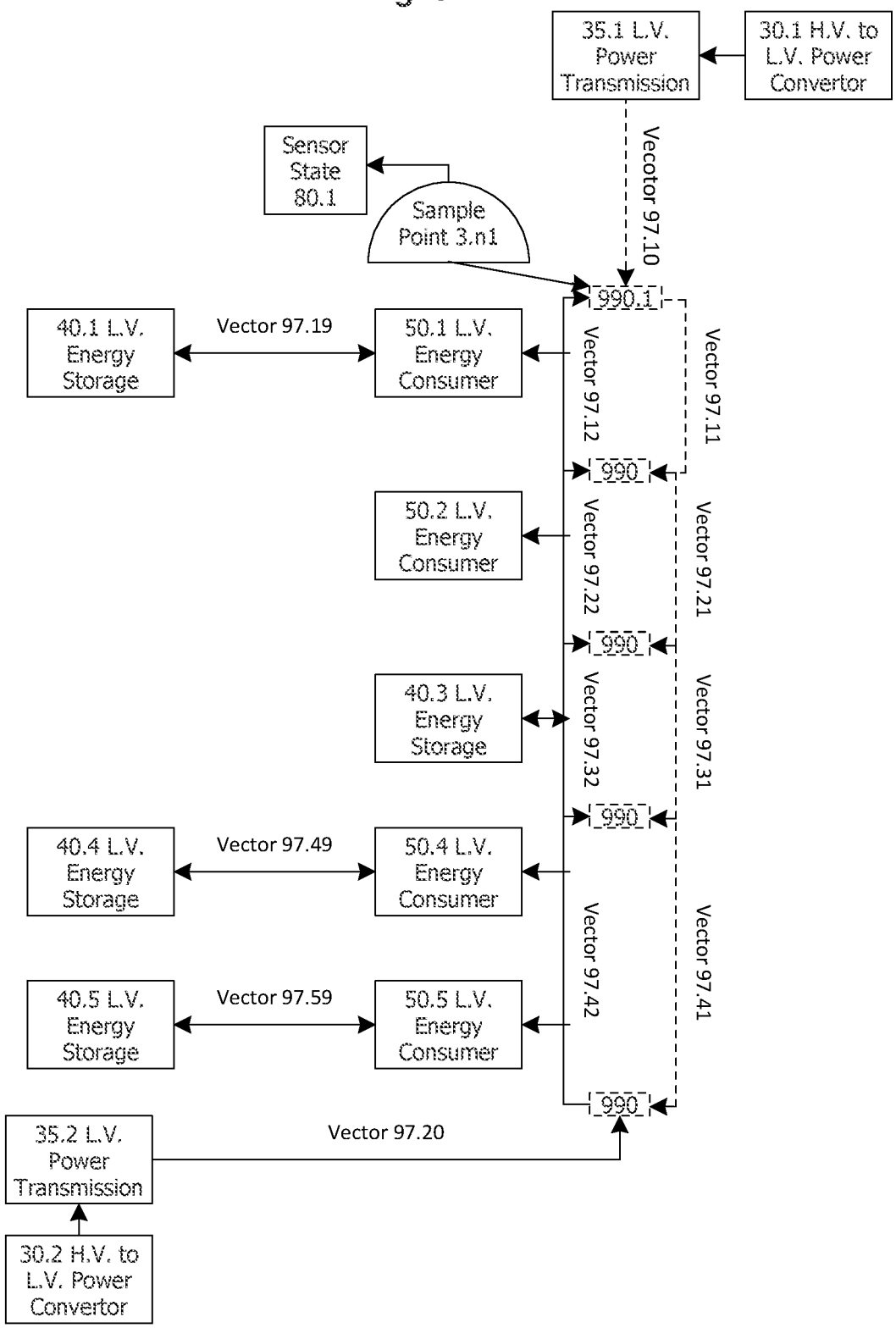
FIG. 6 is a power vector flow diagram of the energy flow between regulated energy segments.

Turning to FIG. 5, FIG. 5 is a process logic flow diagram of the controller depicting the feedforward with feedback architecture such that each connected (and notably those that have communications capability with the distributed control system e.g., IoT or M2M as known in the art) energy storage 40, power generation 10 generator, and energy consumer 50 is directly or at least indirectly via regulator/switch 990 state maintains current and voltage thresholds through the concurrent energy transmission segments 35.$n$.1 as shown to modules 1000.1, 1000.2, and 1000.3 each having an optional energy storage device respectively 40.1, 40.2, and 40.3 as collectively controlled by the transmission control engine 3204. The feedforward portion of the control system preferably provides power generation signals (or at least is responsive to power sources as made available by power generation 10 generators (including energy storage devices external of the distributed control system) through the primary energy transmission grid 90.*e*.1 (understood to be at least one source, such that the system has a primary energy transmission grid for each type of energy source e.g., thermal cold or thermal hot) creating an aggregated energy distribution collective 35.*f* as a function of time. The perturbation engine 3205 in combination with the feedforward application(s) 4024.1 for each type of energy flow improves the feedback portion of the control system responding to real-time actions definitively maintaining each vector and each segment and each energy storage device and each energy consumer within their respective operating envelope (i.e., below their maximum thresholds such as obtained by sensor state 80.2 e.g., voltage and sensor state 80.1 current) to regulate energy flux/flow 500 in real-time to each connected energy storage 40 device becoming an aggregated energy storage as a function of time 40.*f*. The feedback portion also includes at least over-riding regulation and control of energy consumer(s) 50 through an aggregated function of time 50.*f* for each type of energy through the feedback application 3024.2. It is a fundamental inventive aspect of the system such that concurrent energy storage charging within an individual vector/segment occurs with energy storage discharging within a different individual vector/segment such that additional energy flow capacity within a given vector/segment is utilized to greatly reduce (by at least 5%) instances in which energy consumers do not have adequate energy flow through its respective energy flow pathways to meets it real-time energy demand. The fundamental objective is such that the energy flow pathway from the power generation 10 generator is never required to meet the real-time demand of any given energy consumer 50 to reduce peak transmission capacity through a distributed co-located energy storage 40 device such that at least one energy consumer has at least two individual concurrent energy transmission 35.*n*.1 pathways to serve peak demand energy consumption.

The preferred method of system control utilizes the tracking of variable states of including transient conditions, whether it be by weather data, environmental data, calendar data or grid data including grid pricing data collectively referred to as input data. The primary factors impacting the variable states are the energy storage systems as regulated within the segment they are in energy communication with by a first beginning energy flow isolation switch and a second ending energy flow isolation switch (except when the segment is a terminating segment), and energy consumers within the same segment as in direct energy communication to the segment energy pathway transmission or a separate and individually connected energy storage device in energy communication with the energy consumer. The energy flux is a calculated parameter based on each segmented power transmission segment based on a current sensor and a voltage sensor reading, with another important parameter including the energy storage charge or discharge rate and also energy consumption of each of the energy consumers being a reference transient to predict energy flux as a function of time combined with machine learning patterns as obtained and correlated to historic data, calendar impact data, environmental data and weather data. The primary function of the feedforward control system is to establish a variable based on the predicted energy flux of each segmented power transmission segment and an aggregate energy distribution of the each segmented power transmission segment such that a shortfall of energy to each energy consumer is avoided by ensuring sufficient stored energy is available as a function of time on either the same segment in which the energy consumer is on or neighboring segments such that the aggregate current demand (within the voltage threshold) doesn't exceed the current threshold for any of the interconnected segments in which energy flow must take place to meet both the individual demand of each energy consumer as well as the aggregate within each segment. A feedback variable, as determined by the systems control processor establishes a control variable based on a multivariable coupled combination of the feedforward variable and a feedback variable leveraging real-time current and a real-time voltage as available through sensors on each segmented power transmission segment such that energy flow is regulated to prevent the maximum current threshold and the maximum voltage threshold from being exceeded. The multivariable coupled combination of the feedforward variable and the feedback variable is calculated by a discretized dynamic equation (including a vector pattern recognition as established by machine learning as known in the art) with control of each energy flow isolation switch and the energy storage charge or discharge rate for each of the energy storage systems, the aggregate energy distribution as a function of time for each of the segments, and both individual and aggregate stored energy states (both real-time and projected as a function of time) of each of the energy storage systems. An open loop scheduler of scheduled events for energy consumers establishes discrete energy flux demand in combination with the feedforward projected energy flux demand. Variations can occur in an uncontrolled manner from the scheduled events becoming real-time disturbances as compared to the open loop scheduled energy consumer individual and aggregate demand. The control system contemporaneously controls operation of the segmented energy storage system based on the control variable, notably the charging and discharging of energy storage devices including the "movement" of stored energy from one segment to a second segment in anticipation of the energy flow pathway transmission segment being insufficient to meet energy consumer demand without otherwise exceeding the maximum current and/or maximum voltage thresholds.

The control method can suppress through disturbance rejections to attenuate the effects of uncontrolled energy consumers. The control method obtains input data, also from the uncontrolled power generation generators in an interconnected grid or from a combination of uncontrolled or controlled power generation generators on a micro-grid. The control system can apply a method of calculating a new location for any of the energy storage systems relative to another segmented power transmission segment based on a feedforward calculation (i.e., projected) of future current and voltage demand for each segment, and then subsequently issuing manual or automated movement commands for the repositioning of the energy storage system coordinate by an asset movement control system. The asset movement control system utilizes integral mobility devices when available onboard of the repositionable asset, or an external mobility device (i.e., such as a repositionable service asset that has at the least an integral mobility device capable of moving both itself and a then temporarily in structural communications a repositionable energy consuming asset) or the repositionable service asset itself has an energy storage device with the primary purpose of its energy storage device is for transferring energy from its onboard energy storage device to a another temporarily coupled energy consuming asset via its onboard transfer port for energy flux to transfer energy from the service asset's energy storage to the coupled energy consuming asset and secondarily for its own mobility to move from a current location to the location of the energy consuming asset and to at least a second location where recharging can take place. The asset movement control system determines at least one scheduled time, though in most instances a first scheduled time to a first location, and at least a second scheduled time to a second location. When the energy consumer is either transportable or capable of being moved and the energy consumer is preferably outfitted with a wireless power receiver the control system can alternatively issue movement commands for the repositioning of the energy consumer off a first segment to another segment. The control system provides a multivariable feedback control loop having dynamic tuning by the control system to contemporaneously control the operation of all interconnected energy storage device and energy consumer devices within the modular distributed energy system.

Turning to FIG. 6, FIG. 6 depicts the power flow between vector segments such that the vectors are isolated in a bi-directional manner between energy isolated regulators/switches 990. The vectors within the control system are required for each energy communication flow path from all energy sources, which includes (though not shown in terms of additional power "flow" vectors from energy storage 40.3) bi-directional capability enables multiple power sources (such as depicted 35.1 and 35.2 respectively from the top of the figure and the bottom of the figure as shown. Each energy isolated regulator/switch 990 has at least one sample point 3.$n1$ with at least one sensor state 80.1 (as obtained by sensors as known in the art, notably current and preferably also voltage), though only the top regulator/switch 990.1 is depicted. The fundamental objective of tracking the vectors is to ensure that the energy communication pathways never exceed the rated maximum energy flow ratings of each vector segment. The control system specifically controls each regulator/switch 990 in terms of both direction of energy flow and isolation from any specific segment or segments. Vectors are inherently capable of being bi-directional though from a practical perspective energy consumer(s) such as 50.1, 50.2, 50.4, and 50.5 are only capable of drawing/receiving energy and not producing energy unless the energy consumer has pass-through capabilities of integrally connected energy storage devices respectively 40.1, 40.4, and 40.5. Though depicted as two distinct directional-specific vectors (e.g., vector 97.11 and vector 97.12, collectively representing one energy flow segment such that a segment is by definition an energy flow path between two regulators/switches 990 unless the segment is a terminating energy flow path physically only capable of receiving energy from one power transmission pathway whether from a traditional energy source or an energy storage device) for visual clarity it is understood that in virtually all instances it is actually only one flow path but represented in the control system preferably as two different vectors for ease of programming/scheduling such that the vectors effectively have uni-directional energy flow paths. Any given segment can have multiple energy consumers (e.g., 50.4 and 50.5), or service just a single energy consumer 50.2 or a single energy storage 40.3 device. Though not shown, it is understood that virtually any combination of energy consumer and energy storage devices can be in energy communication with an energy segment as isolated by two regulators/switches 990. FIG. 6 doesn't depict any wireless power sources (i.e., FIG. 2 power wireless transmitter 35.5) but it is understood that it is only for the purpose of simplifying the figure and not reflective of the complexity of the invention.

Another embodiment of the invention is when the energy storage device is an electrical energy storage (e.g., battery) embedded in a pocket door which is also integral to the modular wall panel. The guide track for the pocket door concurrently serves as an electrical bus eliminating the requirement for a separate electrical interconnection, while also providing electricity for the pocket door when the pocket door has a method as known in the art to move the pocket door from an open to close (and vice versa) position via an electric motor. The guide track preferably extends beyond the length as required for the pocket door and particularly preferred extends the entire length of the modular panel to provide electrical continuity first to the energy flow regulator and then as interconnection between adjoining modular panels. The integral energy storage device serves as a ballast within the pocket door that also provides a sense of higher quality product of the pocket door due to its heaviness. The sliding capability of the pocket door also serves as a very easy method to enable access and service to the integral energy storage within the modular wall panel. Yet another embodiment of the pocket door has open access such that the when the pocket door is in the open position the energy storage device within the modular wall panel slides into the void space of the pocket door.

Another more recently commercially available form of energy is recognized in the art as "wireless power". Though wireless power is recognized as safe for people, it is an object of the invention to leverage multifunctional benefits of energy storage within 1000 modules such that the energy storage achieves its primary function of energy storage in direct energy pathway with an energy consumer, being a weight ballast to the energy consumer (further enabling the energy consumer to leverage high strength to weight ratio materials and maintaining a safe center of gravity), and reducing the in-module electrical wire requirements. The particularly preferred embodiment of the wireless power is for the wireless power transmitter 35.5 (as in FIG. 3, interior side view) such that the wireless power transmitter 35.5 is in energy communication with the removable and preferably reconfigurable 1020 cover plate. The cover plate is multi-functional in its ability to achieve functions of 1) easy access swinging/sliding door to the embedded and integral energy storage device, 2) variable up or down air flow (when the energy storage is thermal) directional control of the 1025 embedded air flow preferably such that the air flow is achieved on an intermittent (high-frequency of greater than 30 Hz, particularly preferred greater than 300 Hz) basis to increase convective heat transfer from the 40.4 T energy storage device to the physical space in which the 1000 module resides as regulated by the 990 energy flow regulator.

When the energy transmission is in the form of thermal energy within a heat transfer fluid, notably water, the size of the pathway (i.e., pipe diameter) is dictated by temperature differential versus ambient temperature. It is advantageous for the temperature differential of the working fluid to be as high as possible (hot when the fluid is desired as a heat source, or cold when the fluid is desired as a cooling source). Counter to that argument is the higher the temperature differential then requires thick insulation to minimize energy losses. Therefore, it is advantageous for the pipe diameter to be as small as possible to minimize modular wall/panel thickness, as well as minimizing the potential leakage of working fluid. However, the skinnier the pipe the higher the fluid flow resistance. Therefore, the inventive energy storage system has a water fluid system with a pipe diameter at least 10% smaller (and preferably at least 30% smaller, and particularly preferred at least 50% smaller) as compared to a piping system without any distributed energy (thermal) with or without integral water storage. The further optimal piping has an integral drag-reducing coating in the interior of the pipe to reduce friction losses. And the yet further optimal piping has a distributed water recovery/reuse system that enables reuse of the water with its embedded thermal energy so as to further minimize the fluid velocity (and therefore of course the fluid consumption) within the piping. The particularly preferred water recovery/reuse system enables a fluid consumption reduction of at least 10%, preferably at least 50%, and particularly preferred at least 80% as compared to a non-distributed energy storage without water recovery/reuse system. At the very least, an integral fluid to fluid heat transfer heat exchanger exists to enable thermal energy recovery of at least 10%, preferably at least 50%, and particularly preferred at least 80% as compared to a non-distributed energy storage without thermal recovery/reuse system. Water that isn't fully recovered or reused is optimally repurposed as a grey water also on a distributed basis, such as water from the shower being used as toilet water. This has the primary objective of further reducing return piping diameter again reducing modular wall/panel thickness (or sewer return lines) throughout the modular system.

The transmission control engine sequences the charging and discharging of the energy storage modules. Contrary to the prior art in which charging and discharging decisions are made solely on levelized cost of energy at best and most often on the pricing differential between peak and off-peak power, the inventive transmission control engine must also ensure that each transmission pathway remains below the maximum threshold while also needing to minimize the impact of operations of each connected energy consumer. Therefore, the distributed energy storage modules can be scheduled to charge during peak periods in order to meet the predicted (or scheduled) use of energy consumer if in fact the energy storage system can't meet sufficient kWh or kW demand without the additional and concurrent utilization of kWh and kW from the second energy source via the energy transmission pathway from external of the module in which the energy storage is located. In addition, and by system design, during off-peak periods the energy consumer (particularly for high demand, though low utilization factor, devices such as kitchen oven or dishwasher) will concurrently draw energy from both external energy source via the module energy transmission pathway, and the immediately co-located and with direct electrical connection through a second isolated energy from the energy storage device. Both scenarios are inferior in terms operating costs BUT enable the lower initial capital equipment costs to be realized.

A energy transmission system comprised of: a controller, the controller having a memory having at least a portion being a non-transitory memory; a reservation transaction unit to configure, schedule, and dispatch at least one reservation for a network of decoupled energy assets using the non-transitory memory; the network of decoupled energy assets including an at least two energy production generator producing a primary energy source that is dispatchable whereby the primary energy source is capable of being consumed as a function of time independent of its production and capable of being stored in a charged energy storage media within a dispatchable charged energy storage inventory at a first location; the network of decoupled energy assets including an at least one energy production generator producing a byproduct that is dispatchable independently of the primary energy source and is capable of being consumed as a function of time independent of its production and capable of being stored in a module embedded energy storage device; and whereby the controller operates a program stored in the non-transitory memory for an optimization by a model comprised of at location-specific energy pricing, minus projected penalties from failures to provide adequate energy to the energy consumer device.

Figure 7:
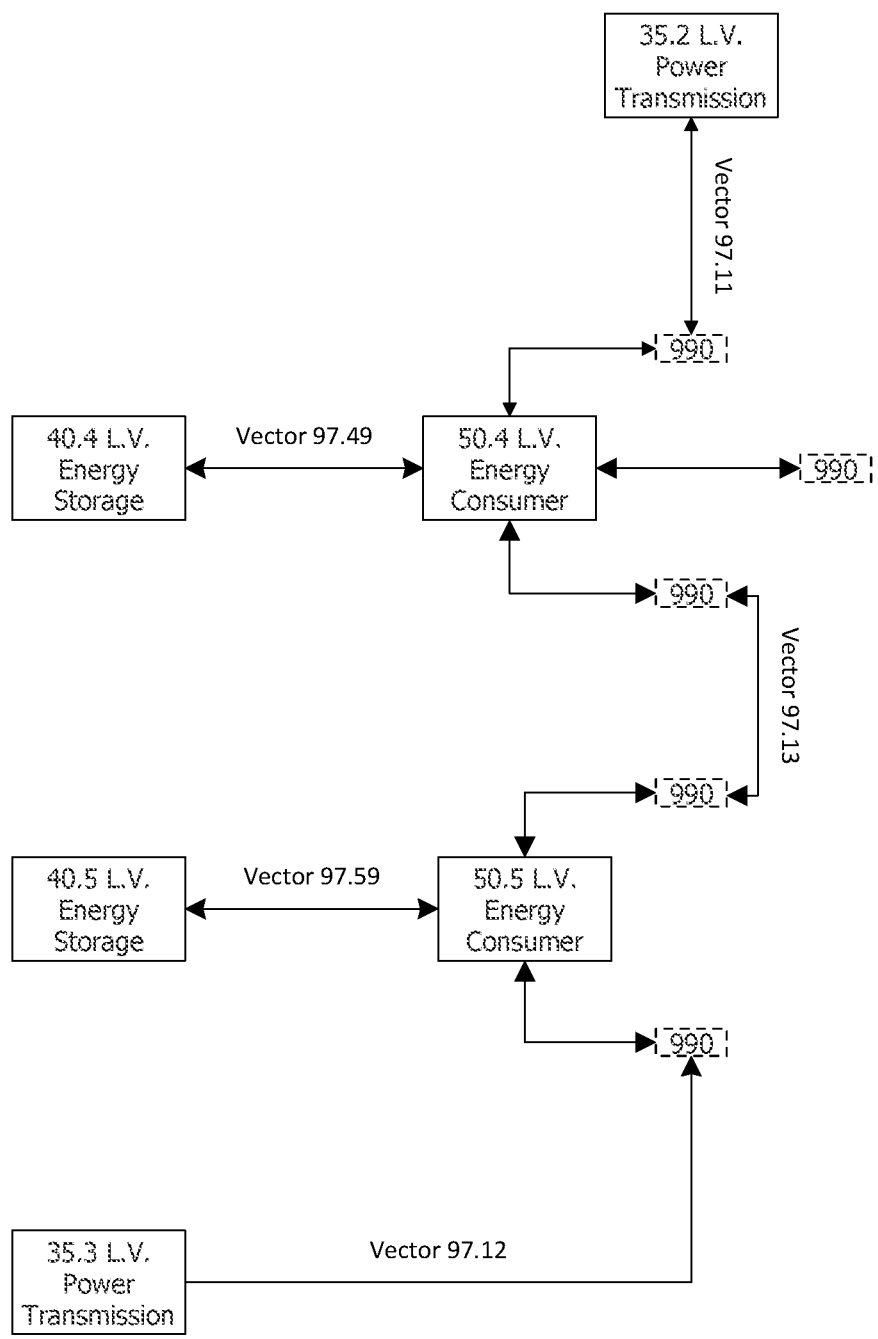
FIG. 7 is a power vector flow diagram of the energy flow between regulated energy segments, though showing more detail than FIG. 6.

Turning to FIG. 7, FIG. 7 depicts additional details as compared to FIG. 6, notably as described in FIG. 6 the two distinct directional-specific vectors (e.g., vector 97.11 and vector 97.12, collectively representing one energy flow segment such that a segment is by definition an energy flow path between two regulators/switches 990 unless the segment is a terminating energy flow path, where each of the energy consumers 50.4 and 50.5 have an isolation switch 990 for each of the energy flow segments. The isolation switch has the capacity to isolate and prevent energy from flowing from the first segment providing energy flow to the energy consumer to the second segment such that a second energy consumer energy flow will not create a scenario where the energy flow of the first segment and the energy flow of the second segment will cause the real-time current and real-time voltage to then exceed the current, voltage and/or power rating of the wire within either of the first segment or the second segment. The isolation switches 990 enable a first segment for the first energy consumer 50.4 to receive power from a first power transmission (i.e., power supply) 35.2, while the second segment for the second energy consumer 50.5 receives power from a second power transmission (i.e., power supply) 35.3. In this figure each energy consumer 50.4 and 50.5 have directly connected (and capable of power isolation though not shown via an isolation switch 990 or as known in the art battery management system providing current (i.e., amperage) control. It is understood that every energy consumer does not require a directly connected energy storage system. Alternatively, any one of the representative energy consumer 50.4 or 50.5 can be substituted (or additional nodes) with an energy storage device having a corresponding battery management system or dedicated isolation switch 990.

Figure 8:
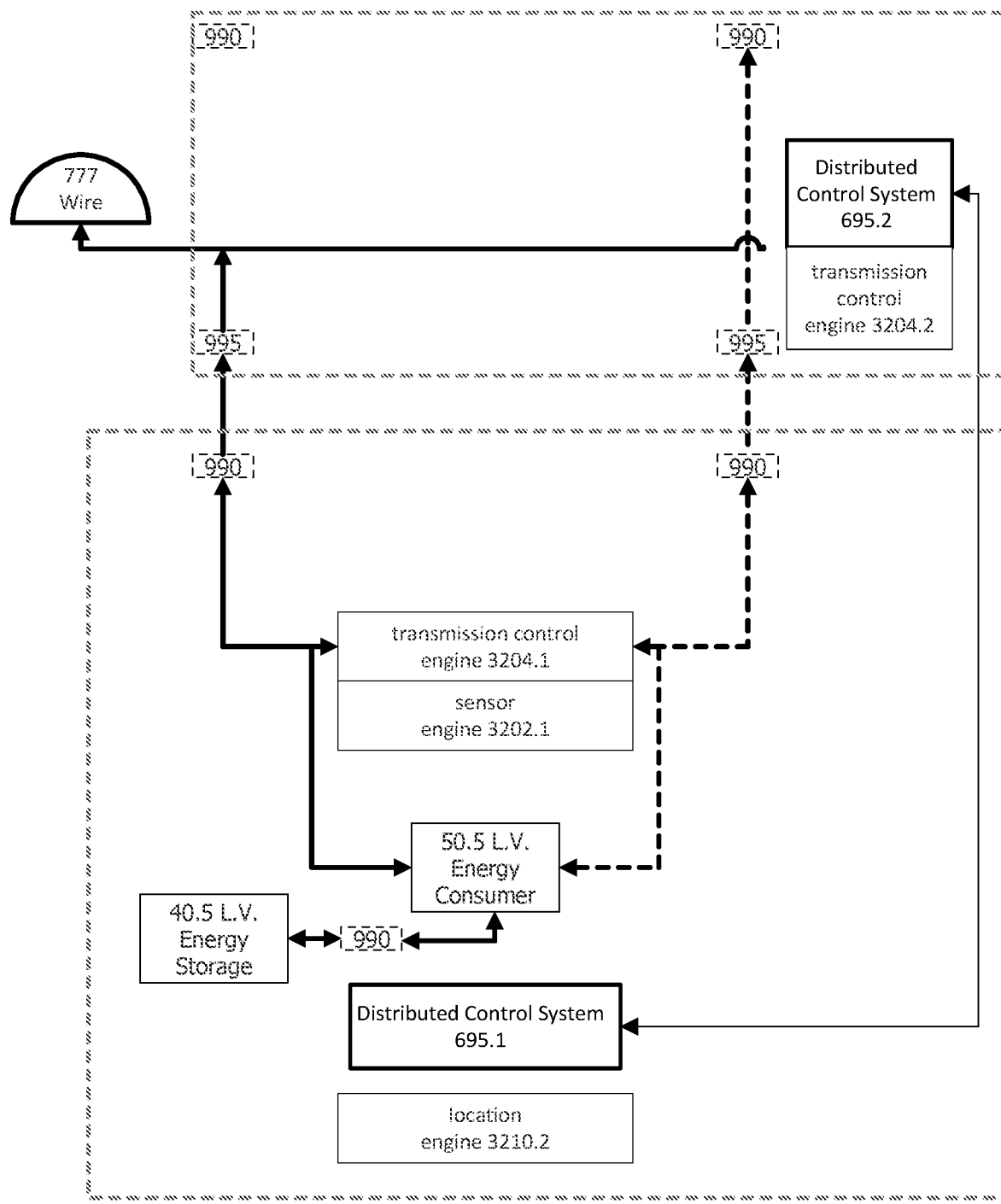
FIG. 8 is a power vector flow diagram of the energy flow between regulated energy segments, though showing more detail than both FIGS. 6 and 7.

Turning to FIG. 8, FIG. 8 depicts further details, though described in the earlier FIG. 6, of the components of the inventive energy consumer 50.5 having a co-located or internal energy storage 40.5 with a distinct and energy flow isolated switch/regulator 990 in electrical communications. The energy consumer 50.5 has a first energy flow pathway through one first energy segment (shown as going into/out of the left-hand side of the energy consumer 50.5) and a second energy flow pathway through one second energy segment (shown as going into/out of the right-hand side, and depicted as a dashed line, of the energy consumer 50.5). The energy consumer has the distribute control system 695.1 in control system communications with sensors (though not shown, each switch/regulator 990 has at least a current sensor and preferably also a voltage sensor) such that the sensor engine 3201.1 calculates the power in each segment so as to ensure each energy source prior to being blended for internal power consumption by the energy consumer 50.5 is sufficient to meet the real-time demand while also ensuring that each segment power flow remains lower than the maximum threshold parameters (e.g., current, voltage, power). As noted earlier, one of the fundamental objectives is to always maintain power and current levels (despite the energy consumer 50.5 requiring peak power in excess of any given segment maximum threshold parameters) at levels not requiring rigid conduit (or restrictions against cascading extension cords). The transmission control engine 3204.1 is that portion of control logic and associated hardware to enable both energy flow into/out of the energy consumer 50.5 but also to either bypass or enable further power consumption into a second energy consumer (not shown in this figure, but shown in FIG. 6) or a second energy storage device (also not shown in this figure, but shown in FIG. 6) such that this energy flow is in electrical communication with switch/regulator 990 (on board or integral of energy consumer 50.5) then through an optional external energy switch/regulator that is adjoining (optimal implementation is such that a magnetic coupling as known in the art maintains electrical continuity, though without the danger associated with accidental dislodging of connector). In this FIG. 8 (995) is shown, with the understanding that both 990 and 995 are not required on the same energy flow segment. Also in this figure the external adjoining segment connector has an onboard distributed control system 695.2 as a well as transmission control engine 3204.2 to control the flow of energy in electrical communication with to a wire pair 777 (at least a positive cable, and preferably also a negative cable rather than assuming alternative ground mechanisms as known in the art) regulate the flow of energy into at least one additional energy consumer or energy storage device. Again it is understood that the external connector can gain all control logic and hardware by the host energy consumer (or energy storage device) yet in the situation that more than at least second (or third, and/or fourth) energy consumer or energy storage device is daisy chained for electrical continuity it is fundamentally advantaged that the external connector (within the top dashed rectangle) has its own dedicated distributed control system 695.2 and transmission control engine 3204.2 such that not only is energy flow provided through 777 but also a bypass pathway as shown with a dashed line through the top dashed rectangle from the lower 995 switch/regulator to the above 990 switch/regulator. The wire 777 can be any cable assembly methods as known in the art, though the preferred is a retractable coiled wire assembly for maximizing speed and convenience of connecting the numerous energy storage and/or energy consumer devices located within approximately the same physical space but multiple feet apart from each other.

Figure 9:
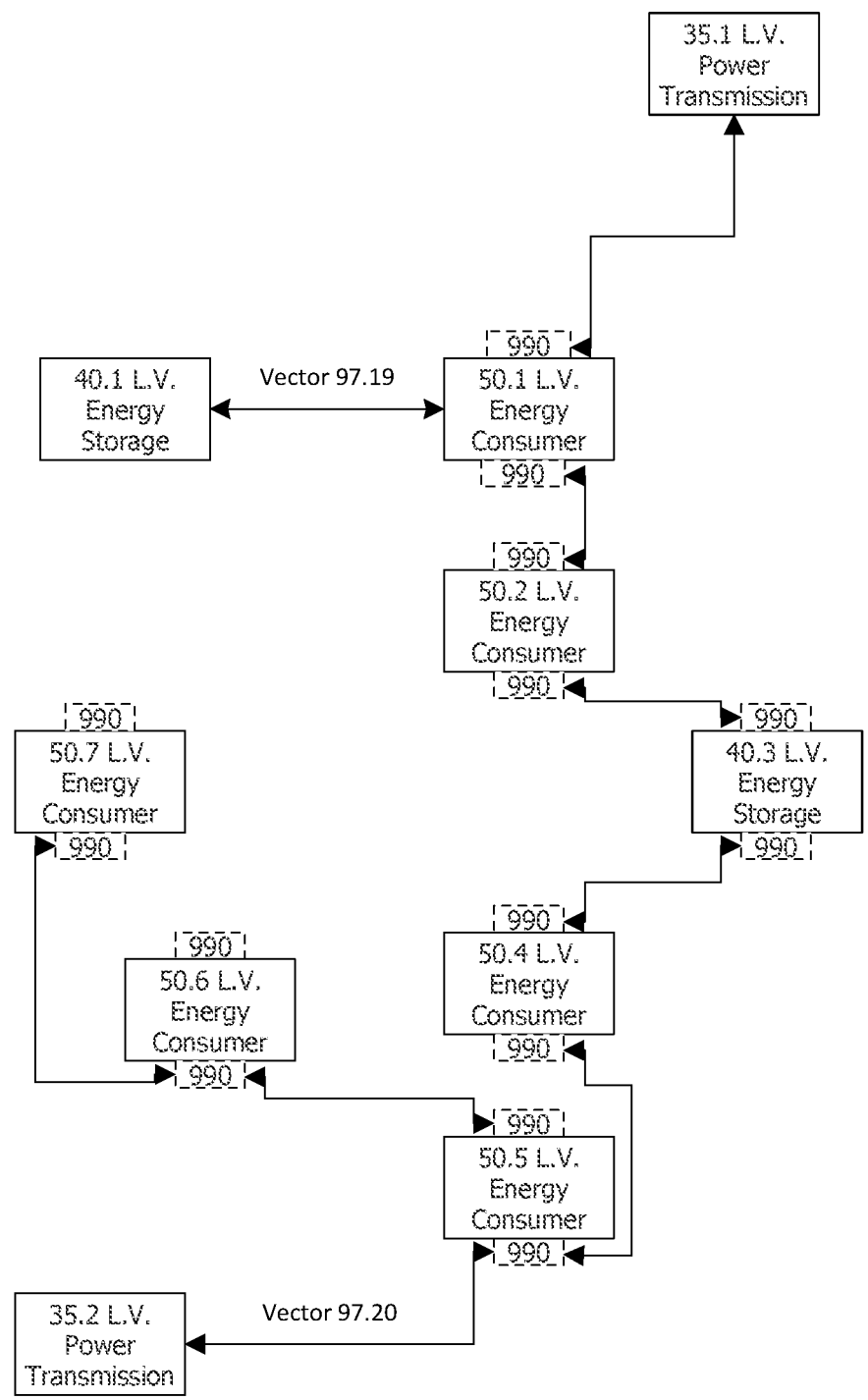
FIG. 9 is a power vector flow diagram of the energy flow between regulated energy segments, though showing more detail than FIG. 6 in terms of the multiple isolated segments for each energy consumer.

Turning to FIG. 9, FIG. 9 shows one exemplary series of daisy chain electrical connections in each inventive energy consumer has at least two isolated energy flow pathway segments (though not shown, it is understood that a series of external electrical connections in excess of two isolated energy flow pathway segments). Beginning from the top of the figure, a first power/energy source is 35.1. This energy flow is through a first segment going into a first isolated energy flow pathway via 990 into energy consumer 50.1, which has another isolated energy flow pathway between the energy consumer 50.1 via segment 97.19 to its adjoining energy storage device 40.1. For being more concise, this above level of detail is not repeated but understood for each daisy chained electrical connection. When power is not isolated but rather enabled to both serve the host energy consumer (or energy storage) device and bypass (though with power isolation and active segmentation) electrical continuity is from energy consumer 50.1 to energy consumer 50.2 to energy storage 40.3 and then to energy consumer 50.4 and then to energy consumer 50.5. As depicted energy consumer 50.5 is in electrical communication with a second power source 35.2 and therefore through active control of each electrical segment it is possible that the aforementioned daisy chain can effectively have energy flow from both power sources to all of the shown energy consumers 50 and energy storage 40 devices, and notably as the inventive system any of the switch/regulators 990 can break the electrical continuity such that a subset is served from the first power source 35.1 and the remaining subset is served from the second power source 35.2. There is an electrical continuity branch from energy consumer 50.5 that flows to energy consumer 50.6 and then to energy consumer 50.7. In this exemplary, energy consumer 50.5 has two external electrical connectors one going to energy consumer 50.5 (as shown on the left) and energy consumer 50.4 (as shown above). It is understood that there is no practical limit to the number of nodes as well as the number of branches therefore enabling the range of energy consumers and energy storage devices to be easily served in a manner that eliminates rigid conduit and therefore a very important feature to enable reconfigurable and dynamic placement of the host devices.

The following inventive features go beyond the inventive utilization of distributed, decoupled dynamic placement of energy storage assets, which notably enhances the DMS building effectiveness to ensure optimal comfort, safety, and operating profitability by maximizing DMS reconfigurability whether it be demanded in response to tenant turnover, daily functionality schedules, seasonal functionality schedules, or even daily/seasonal weather changes.

Virtually all physical structures, whether they be solar farms, greenhouses, or buildings ranging from residential, commercial, or industrial, hereinafter referred to controlled space or controlled atmosphere space "CAS" are also designed with infrastructure capacity to support an engineering maximum in terms of capacity including air conditioning and heating, dehumidification, air quality, lighting, and electrical transmission. Engineering maximum is also referred to as Design Load for each parameter (e.g., removal of heat and humidity by an air conditioning system, addition of heat and humidity by a heating system, air decontamination rate by air quality device etc.).

Engineering maximum design largely supports internal demands, and meets worst-case scenarios in which the full range of functions within the controlled space are based on the unlikely concurrent occurrence of virtually all functions and therefore demand the full engineering maximum design specification, due largely to core infrastructure assets being stationary in terms of position within the CAS even though the core infrastructure assets operate in a dynamic manner in terms of control actuators to temporarily reduce operating capacity to a lower operating load than the engineering maximum design load that reflects the actual real-time load (or in best case scenarios remaining stationary but basing operations on a projection of future demand such as preheating or pre-cooling) in order to maintain a control setpoint (typically with a feedback control system). Regardless of the setpoint being determined solely on real-time conditions or accounting for future demand, the stationary placement of core infrastructure assets largely prevents the controlled space from achieving a high-capacity utilization factor of the core infrastructure assets. Core infrastructure being typically comprised of heavy (in terms of weight) assets place significant tributary loads and dead loads on the supporting structure of the controlled space. As a result, the inventive system utilizes both feedforward control in conjunction with feedback loop control, where the feedforward control most importantly determines an operating envelope defining a range of safe asset position and orientation to ensure structural integrity of the CAS as well as primary function of each asset to achieve at worst case an operating capacity that exceeds the real-time conditions. The feedforward portion of the control loop predominantly ensures safe operations of all electrically powered devices including DMAs such that the specific function performed to accomplish the Internal Task or External Task always remains in the operating limits of the power distribution system, and then combined with the feedback portion of the control loop predominantly ensures meeting the specific setpoint for the specific function performed to accomplish the Internal Task or External Task is adjusted on a real-time basis within the boundaries established of the power distribution system.

Inventive DMA requirements support the repositioning of the DMA(s) within the reconfigurable space as well as a minimum set of onboard functionalities selected from the group of: emergency egress direction visual indicators, safe egress pathway during emergency, safe pathway during non-emergency; air flow, air quality, segmented air partitioning and air decontamination, proximity to displacement air inlet and/or discharge as well as relative position vector; proximity to wireless power transmitter, static electricity outlet; proximity to renewal position; proximity and/or minimized pathway distance to execute Transfer Task; and/or Functional Task performance and effectiveness. The preferred DMA varies its controlled outputs (e.g., temperature, humidity, light levels, etc.) to perform a more optimized Functional Task(s) using a feedback control loop once the DMA position and orientation are determined using a feedforward control optimized across the domain of potential DMA position and orientation within a geofence space representing a superset of physical space area from which the DMA actual physical location is established within the current geofence is determined while first ensuring CAS structural integrity. An inventive environmental geofence is both a functional of time and space representing an environmental parameter that is impacted by an environmental asset performing its respective operating task such as temperature, humidity, CO2 air quality, oxygen air quality, etc. It is further recognized that each control parameter having a setpoint has its own respective environmental geofence. A particularly preferred DMA has the ability to further vary its outputs in accordance to its inputs to precisely match an at least two-dimensional real-time parameter requirement within the current geofence, and the real-time feedback control for each DMA varies its outputs in accordance to real-time sensor parameters to minimize the differential between the real-time condition and the real-time setpoint condition within the at least two-dimensional real-time parameter requirement within the current geofence.

Another preferred DMA is a "Service DMA that is repositionable, preferably having operational autonomy and more preferably also having self-powered mobility, to execute Transfer Task(s) to an at least one second DMA. It is further anticipated that a Service DMA executes a first movement to operationally execute a Transfer Task to a first DMA, followed by at least a second movement to operationally execute a Transfer Task to a second DMA. The placement of DMAs optimally accounts for the required space of the Service DMA relative to the DMA in which the Transfer Task will take place as well as required space for the Service DMA to move throughout the stationary structure(s) and asset(s) in proximity to both reach the DMA that the Service DMA will perform the Transfer Task from its current position as well as to dock (or at least minimize the wasted space between the DMA and Service DMA) with the DMA in which the Transfer Task will take place.

Yet another Service DMA performs the task of repositioning a second DMA from a first position (and orientation) to a second position (and orientation). It is anticipated that certain scenarios could maintain the same orientation relative to the DMS for both the first and second positions, or alternatively maintain the same position relative to the DMS with a distinct first orientation from the second orientation. The repositioning by the Service DMA can be performed by towing, pushing, pulling, rotating, or lifting the second DMA. The DMS control system is in communication with the second DMA to transition to a movement mode to ensure safe movement and subsequent performance of the functional task(s) capable of being performed by the second DMA upon being repositioned and returned to a stationary state. The movement mode, depending on the functional task(s) can range from remaining in a fully operational state when movement has no bearing on the onboard equipment to lockdown state when movement is either not safe or when movement concurrent with being in a fully operational state may damage the onboard equipment. Though less than ideal, the Service DMA may incrementally move the second DMA principally for the purpose of executing the Transfer Task. An inventive feature of the preferred Service DMA has operational capability of both incrementally moving the second DMA in which the Transfer Task will be executed upon as well as executing the Transfer Task.

Another inventive feature of a preferred DMA is both an onboard camera and wireless communication device such that the onboard camera serves as both anti-collision and enhancing the position accuracy representation of at least a second DMA within the DMS. It is known in the art that triangulation using wireless communication methods can establish position in relationship to the other wireless devices, but this method particularly in indoor environments further susceptible to signal reflection (especially when the position of other DMAs will vary signal reflection such that fixed error adjustment/calibration methods will be demanded too frequently). It is an advantage of the inventive system such that the DMA as it moves between a first position to a second position will communicate to the control system both onboard anti-collision signals in addition to relative positioning of at least one second DMA and to relative positioning to known fixed positions within the stationary portions of the DMS. This approximately continuous positioning method provides both the control system and digital twin with an enhanced positioning errors of at an least 5% reduction as compared to solely the use of wireless communications triangulation methods (and preferably an at least 20% reduction, and specifically preferred an at least 80% reduction), while concurrently providing orientation accuracy relative to both the DMS and also between the multiple DMAs within the DMS. Contrary to a traditional building where great efforts are made to have all infrastructure assets precisely placed to their design architectural drawings, the inventive DMS with at least one Service DMA can self-calibrate to the then current DMS determined DMA position and orientation. Furthermore, the traditional building design process is a painful process by architects and engineers to anticipate virtually all scenarios in which the building must operate leading to oversized, over-engineered structural capacity, infrastructure capacity, and fixed load capacity (though often with variable operating load to meet real-time conditions) rigidly integrated into the stationary structural components (that are also over-engineered). Distributed and decoupled assets that are not directly in electrical communications with the stationary structural components are fundamental to the inventive DMAs within the inventive DMS. DMAs that are further not directly in thermal communications with the stationary structural components and stationary environmental components are first empowered by having onboard electrical stored energy or power generation capacity. DMAs that are further not directly in fluid communications with the stationary structural components and stationary piping components are first empowered by having onboard electrical stored energy or power generation capacity. DMAs that have environmental functions (e.g., any thermodynamic cycle, or dehumidification) and that are further comprised of onboard thermal energy storage to capture the byproduct not serving the CAS within the immediate vicinity of the DMA have an expanded operating envelope geofence (as compared to often constrained to the perimeter of the CAS) have the advantage of personalization of the CAS with segmentation into smaller CAS for higher energy efficiency. DMAs enabling more personalization in smaller CAS reduce the fixed environmental duct size and increase the energy efficiency both further amplifying the ability of environmental infrastructure to be disconnected to stationary and fixed components of the building. This is one exemplary where energy efficiency gains enable a reduction in energy consumption and peak power demands further enabling the DMA to have a smaller onboard energy storage, which then leads to a substantial weight reduction of the DMA, which then enables the structural capacity to serve more DMAs. The resulting inventive system maximizes DMS flexibility to vary operating functions and minimizes full lifecycle capital and operating costs.

The particularly preferred reconfigurable building structure utilizes a digital twin to model at a minimum the structural impact of repositionable assets on tributary area, tributary load, and dead load that is performed using a structural analysis software module capable of considering the varying locations of each repositionable asset. Another exemplary software module performs computational fluid dynamics "CFD" to model the varying external factors on the reconfigurable building structure (i.e., weather, wind, solar intensity, etc.) and real-time as well as projected occupant data with corresponding environmental impact associated with the occupants respective operating task(s). The digital twin CFD system accounts for the repositionable assets energy consuming impact on the approximately immediate vicinity within the CAS (as well as the more far-reaching and aggregate environmental impact beyond the close in proximity CAS), which includes thermal impact of energy conversion losses, energy dissipation, etc., and most importantly the performance of the environmental control devices (e.g., air conditioner, heat pump, resistive heating, thermoelectric, etc.) including the radiant surface impact (both stationary surfaces) as well as onboard exterior-facing radiant surfaces (i.e., impacting the CAS) that consume onboard electrical energy from an onboard electrical energy storage system. Particularly preferred CDF models consider airflow velocity, airflow direction, as well as temperature and humidity. A specifically preferred digital twin further models air cross contamination, safe egress pathways, occupant traffic flow on a real-time and a predictive basis such that the resulting digital twin is integral to calculating, scheduling, and coordinating the location of each repositionable asset including the scheduling and coordinating of service repositionable assets to recharge the non-service repositionable assets. It is understood that the inventive system has both service repositionable assets that can at least move an energy storage system to the repositionable asset for energy flux transfer via the transfer port to the then current location of the non-service repositionable asset, move the repositionable asset to a transfer location in which energy flux still is transfer via the transfer port to a "recharging location" (in which the digital twin determines this recharging location such that safe egress is maintained, and schedules the recharging event to take place at a time in which the movement of the repositionable assets has minimal adverse impact on the occupant traffic pathways).

A preferred environmental DMA is void of thermal and fluid communications through fixed and stationary piping and is void of fixed and rigid structural communications to the building. One embodiment of the environmental DMA preferably has a phase-change material for stored thermal energy and a radiant thermal spreader in thermal communications with the phase-change material. Another embodiment of the environmental DMA has a phase-change material for stored thermal energy and an electrically powered fan in electrical communications with an onboard electrical energy storage (or alternatively a hydrogen fueled fuel cell power generator) with the resulting airflow in thermal communications with the phase-change material. Yet another embodiment of the environmental DMA has a phase-change material in thermal communications with the non-desired thermal byproduct of the CAS powered by a thermodynamic cycle (e.g., heat pump) consuming electricity from an onboard electrical energy storage. This embodiment is serviced by a second Service DMA to replenish the electrical energy storage capacity as required, and a third Service DMA to change the phase-change material such that the non-desired thermal byproduct doesn't enter the immediate vicinity CAS and further is utilized in a different zone desiring the thermal byproduct (e.g., domestic hot water). Yet another embodiment of the environmental DMA has liquid desiccant to dehumidify the immediate vicinity CAS as an ultralow energy consumption method to achieve comfort. Airflow is controlled and circulated by an air movement device (e.g., fan blade, etc.) in structural communications with an electric airflow motor that typically pushes (though can also pull) air into the approximately (e.g., within 1 foot, or preferably within 3 feet, or particularly within 5 feet, or specifically preferred within 8 feet) immediate vicinity within the CAS.

Another exemplary repositionable energy consuming asset (of the environmental type) utilizes electricity from the electrical energy storage component to power an electrical compressor motor driving a compressor (i.e., heat pump, air conditioner) as part of a thermodynamic cycle changing the pressure of a thermodynamic working fluid. It is known in the art that downstream of the compressor is the high-side operating pressure having a high-pressure side heat exchanger (i.e., condensor) and upstream of the compressor is the low-side operating pressure having a low-pressure side heat exchanger (i.e., evaporator). A preferred embodiment has another energy storage component (thermal type) in thermal communications with the condensor when the repositionable asset is providing cooling to the CAS, and another energy storage component (thermal type) in thermal communications with the evaporator when the repositionable asset is providing heating to the CAS. It is understood that this latter thermal energy storage can be switched to be in thermal communications between the high-side and low-side and further preference would be to change the thermal energy storage having a phase-change material to respectively perform the cooling or heating functional on a seasonal basis. The inventive control system, notably the portion that regulates environmental parameters is referred to as the environmental control system, modulates at least one environmental parameter for the CAS (which is preferably represented by a geofence as a function of time and space). The control system utilizes a feedforward portion of the control loop to modulate the environmental parameter setpoint in accordance to energy consuming parameters creating an environmental parameter energy limit setpoint. The feedback portion specifically operates the energy consuming operating tasks to minimize the deviation of at least one environmental parameter actual real-time value from the corresponding environmental parameter setpoint. The feedforward portion of the control system minimizes energy consumption by at least 1%, preferably at least 3%, particularly preferred by at least 10%, and specifically preferred by at least 20% due to overarching energy constraints of either the aggregate of reconfigurable building structure energy demands or to synchronize the available onboard energy within the repositionable energy consuming asset energy storage system with projected available service repositionable assets that can recharge the repositionable energy consuming asset energy storage system. The energy limited setpoint is referred to as environmental parameter energy limit setpoint, which is associated with the non-energy limited environmental parameter setpoint. It is understood that each controlled parameter has its corresponding setpoint (e.g., temperature, CO2 ppm, O2 ppm, humidity, air quality, etc.).

The onboard source of electricity within the inventive DMA is anticipated to include a) a storage tank of charged electrolyte and a second storage tank for discharged electrolyte with a flow battery, b) a standard electrochemical non-flow battery (e.g., lithium ion) that begins in a charged state, or c) a hydrogen fueled fuel cell electricity generator. The respective Service DMAs will a) remove discharged electrolyte (i.e., low-energy state) and provide charged electrolyte (i.e., high-energy state), b) recharge the battery using electricity from onboard of the Service DMA (which can also have any of the aforementioned types of stored electrical energy), or c) provide hydrogen (i.e., high-energy state) and remove water (i.e., low-energy state). Another embodiment of a Service DMA transferring water, which serves the function of eliminating the requirement for a fixed stationary pipe for fluid communications, is a Transfer Task of providing clean water (i.e., analogous to high-energy state) and removing dirty water (i.e., analogous to low-energy state). An exemplary use case is a bathroom or kitchen sink function now being able to be a movable "island". Yet another Service DMA is used to regenerate absorbent or adsorbent media that includes carbon dioxide or water vapor both used to improve air quality for environmental control within a CAS. The regeneration can be either onboard within the same location using as known in the art regenerative methods or can be swapping of rich absorbent or adsorbent media (i.e., becomes analogous to high-energy state) with weak absorbent or adsorbent media (i.e., becomes analogous to low-energy state). When the inventive system has a hydrogen generating device placed (e.g., electrolyzer) in the interior of the building concurrent with people (or animal) occupancy as an exemplary water electrolysis device will generate oxygen as a byproduct of hydrogen. The further co-location, or at least having hydrogen communication with another DMA, with a hydrogen fuel cell power generator has the benefit of shifting electrical peak generation time. When the water contains organics, it is known in the art that electrical consumption is substantially reduced and can become a net electrical generator (i.e., electricity to produce hydrogen is less than the electricity generation uniquely enabled by an exemplary hydrogen fueled power generators notably hydrogen fuel cells. Another preferred embodiment therefore is the further co-location of a dirty water source (i.e., containing organics that can be electrolyzed) through the disadvantage of CO2 byproduct could offset the advantage of oxygen byproduct.

The system in which DMS(s) and DMA(s) operate further provides a movement scheduling engine with the DMA beginning at a first starting position to a second operating position for that specific first DMA when the DMA is capable of movement itself (i.e., autonomous), or to a secondary DMA when the first DMA is both not capable of autonomous operations and the secondary DMA is capable of both movement itself and repositioning of the first DMA by the first DMA joining in structural communication with the second DMA on a temporary basis. The particularly preferred embodiment has docking capabilities between the second DMA to the first DMA for transferring energy between the two DMAs (whether it be charged energy stored in the second DMA to the first DMA, or discharged energy stored in the first DMA to the second DMA for future energy regeneration). The system accounts for structural impact always remaining below the structural capacity from the starting position to the ending position of each DMA and the aggregate of DMAs (including transient movements of secondary DMAs to support primary DMAs) as a fundamental core feature (preferably by leveraging a dynamic digital twin reflecting the position and orientation of each DMA), including ensuring that the movement vector (i.e., transport pathway) always maintains the safe structural integrity of the CAS. It is understood that the movement vector from the starting position to the ending position considers safe distancing between other DMAs, static infrastructure, personnel occupancy, and personnel movement pathway position. The preferred movement vector minimizes sound disturbances, from the aggregate of DMA movement noise as well as DMA functional operation both while in transit as well as arriving at its ending point, to personnel within the geofence where sound disturbances parameters include noise emission intensity and vector direction. The particularly preferred movement vectors also minimize visual disturbance to personnel within the geofence having visual contact accounting for the projected optical field of view of those personnel. Scheduling of Transfer Tasks takes into account the time duration to execute the Transfer Task, proximity (as well as tasks being performed) of occupants in proximity of the DMA receiving the Transfer Task or the pathway in which the Service DMA takes to reach the DMA receiving the Transfer Task, and of course the consumption rate relative to current capacity of the DMA receiving the Transfer Task for which the transfer task will renew its capacity.

The inventive system determines DMA position and orientation by optimizing based on functional emitting vectors for the DMA controlled output including at least one from the group of light output, air flow discharge (whether it be for conditioning of temperature, humidity, decontamination, or partitioning), etc. The emitting vector is relative to additional DMAs in proximity to this first DMA as well as stationary infrastructure assets of the DMS having an impact within the physical space geofence in which the DMA achieves its at least one primary function. It is a feature of the invention to vary the emitting vector (and optionally also the inlet vector) on board of the DMA in conjunction with other DMAs and stationary infrastructural assets impacting the same functional parameter, the intensity, and additional parameters linked with performing the Functional Task particularly relative to the projected Geofence Load Profile as a function of time. The DMA operates specifically based on the feedforward setpoint condition that dynamically varies as a function of time, and the feedback control loop based on real-time conditions.

The system prioritizes scheduled events to change operating parameters of the DMAs outputs keeping the DMA at the same location within the geofence prior to additional scheduled events that also changes the position of DMAs within the geofence. When (and if) the system determines the DMA is not able to meet real-time or predictive sufficiency of Functional Tasks at the current position and orientation then the system reinitiates the modeling to determine a next position of this DMA which could also trigger the movement of additional DMAs. It is understood in most instances that the system also determines the balance of meeting the operating demands between stationary assets and DMAs by utilizing the operating cost engine that includes energy efficiency of each asset, effectiveness of each asset to meet actual load demand at the current position and within the geofence plus costs associated with the movement of DMAs from a first starting position to a next ending position.

A fundamental advantage of the DMS is a higher utilization rate of the inherent structural capacity of the DMS by deploying assets only as needed in current operating conditions, and in accordance to current demand loads, beyond a utilization rate based on an aggregate of worst-case structural scenarios otherwise typically used in the design of structures. The preferred embodiment achieves a higher structural utilization rate with DMAs of at least a 5% (particularly preferred at least 10%, and specifically preferred at least 20%) improvement compared to a CAS without DMAs (i.e., only stationary infrastructure assets).

A fundamental advantage of the DMS is a higher utilization rate of the inherent functional capacity of the DMS by deploying assets only as needed in current operating conditions, and in accordance to current demand loads, beyond a utilization rate based on an aggregate of worst-case functional scenarios otherwise typically used in the design of structures. The preferred embodiment achieves a higher functional utilization rate with DMAs of at least a 5% (particularly preferred at least 10%, and specifically preferred at least 20% to approximately at least 80%) improvement compared to a CAS without DMAs (i.e., only stationary infrastructure assets).

Minimizing the aggregate of structural and functional loads of the DMS due to execution of primary functions, while importantly calculating and determining the structural and functional loads as a function of time accounting for variability particularly of the full set of DMAs positioned throughout the DMS, enables the system to achieve higher effectiveness (i.e., increased revenue, lower amortized costs, etc.) by scheduling as a function of time secondary functions.

A yet further advantage of the DMS leveraging DMAs is smaller air ducting requirements of at least a 5% (particularly preferred at least 10%, and specifically preferred at least 20% to approximately at least 80%) for performance of HVAC functions, which significantly extends the capabilities to reconfigure space whether the time domain be a schedule based on specific events, hourly, daily, seasonally, or a change in physical space function. Smaller ducting requirements within the CAS has the secondary impact of reducing the presence of physical obstructions that limit the placement of DMAs and increase the complexity associated with virtually all stationary core infrastructure assets due to interference potential associated with fluid piping, electrical cable/wire/conduit, and even lighting transmission. Maximum reconfiguration flexibility is achieved when the air ducting is approximately eliminated, though benefits are realized when the air ducting has a height of less than 1 foot (or preferably less than 6 inches, or particularly preferred less than 3 inches). Minimizing air ducting greatly reduces the DMAs actuator distance range to ensure when desired an elimination of air gap between the top of the DMA and the ceiling bottom of the DMS (that is particularly important in reducing sound transmission, and air cross-contamination). It is understood that lighting emittance is analogous to radiant emittance whether it be from a stationary source or embedded source in a DMA. It is further understood that air flow emittance is analogous to radiant emittance whether it be from a stationary source or embedded source in a DMA, though in the instance of air flow an air inlet is also present (with the as known in the art placement of the inlet relative to the discharge minimize mixing and non-desirable cross-contamination of contaminated air respective with clean decontaminated air.

Another further advantage of the DMS occurs when leveraging intentional air stratification. The traditional, non-inventive, building virtually always eliminates air stratification due to environmental parameter (e.g., temperature, humidity, air quality, etc.) non-homogeneity. The inventive system places DMAs to provide comfort to the occupants in its immediate vicinity and intentionally discharges into air stratification zones such that air stratification creates an effective barrier from the immediate vicinity. This is of particular benefit to reduce air cross-contamination between adjoining "immediate vicinities", and minimize the use of fixed and rigid ducting within the interior portions of the occupied space.

Figure 11:
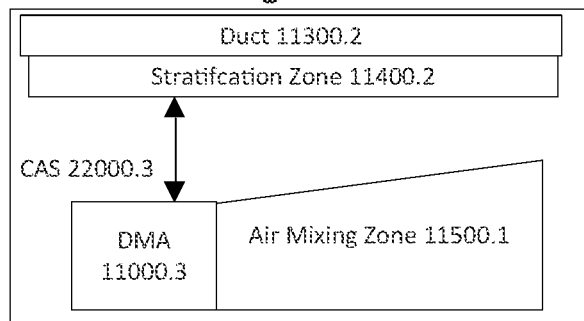
FIG. 11 is side view of the controlled atmosphere space with a focus of repositionable assets of the environmental type.

Turning to FIG. 11, FIG. 11 depicts a CAS 22000.3 having a stationary duct 11300.2 in airflow communications to an adjoining stratification zone 11400.2. In this embodiment the DMA has the ability to either draw in "concentrated" air preferentially from the stratification zone as a means to greatly reduce or eliminate air cross contamination within the CAS, and then to preferentially direct the outgoing air (preferably through a not shown high-gravity force air decontamination device) into a air mixing zone 11500.1. Alternatively, the DMA can push in air that is already potentially contaminated from occupants within the CAS into the stratification zone to minimize the potential for air cross contamination. Utilization of directed airflow, particularly by leveraging a DMA onboard high-gravity device uniquely increases the ability to create a CAS that is more effectively isolated to a second CAS even the CAS is adjoining or in immediate proximity therefore effectively becoming a container-less CAS that operates as if it is effectively within a container isolating air cross contamination.

Another fundamental advantage enabled by dynamically repositionable assets deployed to a non-deterministic position, particularly in the HVAC space is the effective decoupling of the low-pressure side from the high-pressure side of the thermodynamic cycle within the space that the DMA is positioned by leveraging energy storage. A particular embodiment of this energy storage is a liquid desiccant for dehumidification purposes (to reduce the sensible load required for cooling) and therefore a further reduction in ducting requirements. Liquid desiccants (i.e., analogous to absorber media) have a greater thermal energy density than most phase-change materials. Utilization of energy storage within the DMA as noted before also reduces by 50% the number of connections between the DMS and the DMA (if utilizing a static connection point) or a second DMA for performing Transfer Tasks, or when docking at the Renewal Position. As known in the art, a movable room air conditioning system operates a compressor to provide cool air (i.e., evaporator) within the room BUT there must be an exhaust air duct to contain the hot air from the condensor (high-pressure side of heat exchanger to remove heat of compression) that is ultimately vented to outside of the room/geofence to produce net cooling. The otherwise requirement for this exhaust air duct severely limits the placement of the DMA and therefore the ability to reconfigure the physical space. Similarly, a dehumidifier exhausts heat of compression typically into the same space as being dehumidified unless outfitted with a flexible pipe to reach perimeter of the room and to externally vent outside of the room. The inventive system enables either the DMA to be moved back to the Renewal Position for liquid desiccant regeneration (i.e., returning liquid desiccant analogous of weak low-energy state to rich high-energy state), or to dock in the current position (or second position different than the Renewal Position) to a second Service DMA for either transfer of the weak liquid desiccant for regeneration at yet another location or for the second Service DMA to regenerate the liquid desiccant and then subsequently move the waste heat into a position external of the current geofence.

Figure 14:
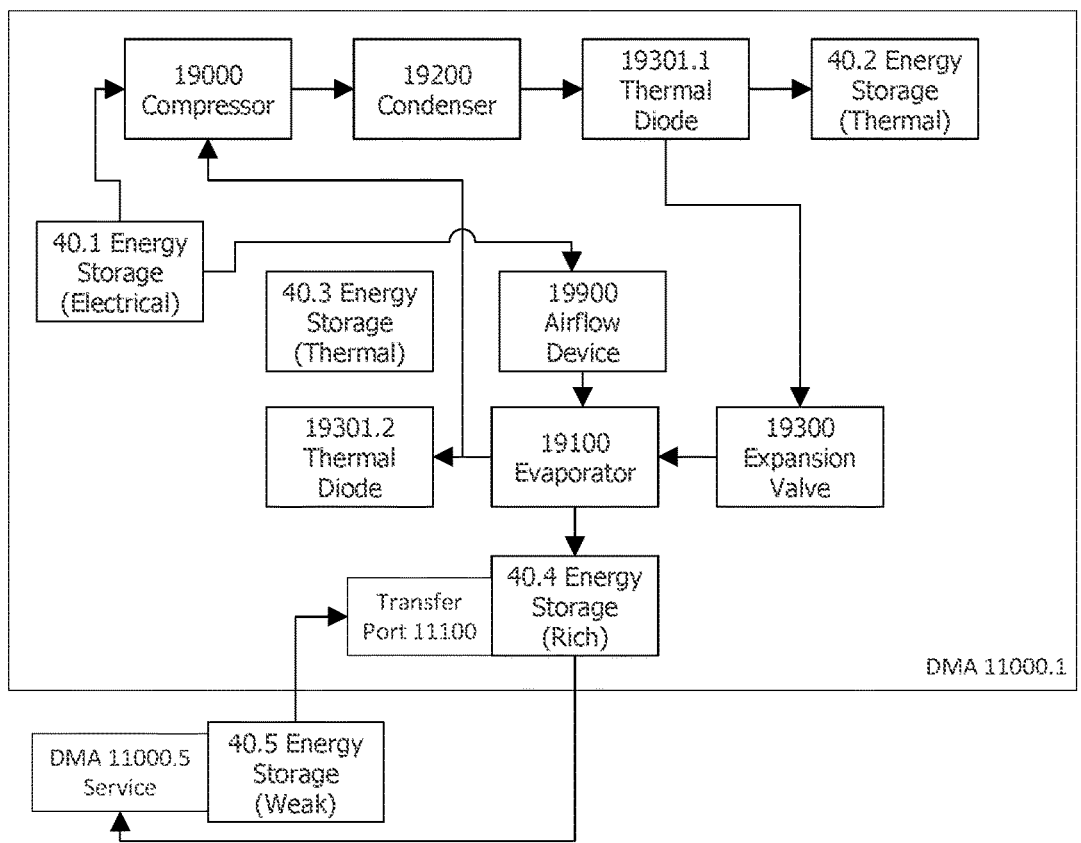
FIG. 14 is a functional object view of a repositionable asset operating for environmental control serving the area in the approximately immediate vicinity of the repositionable asset.

Turning to FIG. 14, FIG. 14 depicts an otherwise typical air conditioning (or refrigeration cycle) having a compressor 19000 (in electrical communication with the energy storage system of electrical type 40.1, which is also in electrical communication with the airflow device 19900 as shown as well as onboard control systems, sensors and non-inventive components also on the DMA) that is upstream of the condenser 19200 and in thermodynamic working fluid communication. The energy storage of thermal type 40.2 is in thermal communications with the condenser 19200, being thermally switchable as known in the art by a thermal diode 19301.1 (representative of virtually any method to reduce or eliminate heat transfer between the condenser 19200 and the energy storage system 40.2). The thermal isolation of the condenser to the CAS (not shown) enables the DMA to be placed virtually anywhere within the CAS, thus decoupling the otherwise restriction of placing the condenser 19200 outside of the CAS (e.g., a traditional HVAC split system) or alternatively within proximity of the perimeter of the CAS having a ducted airflow removing the waste heat from environmental type DMA. The further utilization of the energy storage of thermal type 40.2 in this capacity uniquely enables this waste heat to be moved into a second CAS (or other operating function e.g., domestic hot water, desiccant regenerator, etc.) in which this waste heat is effectively utilized. The thermodynamic working fluid is in fluid communication with the expansion valve 19300 (or other means to reduce the pressure of the fluid) which is then flowing into the evaporator 19100 thus providing cooling into the CAS by airflow as driven by the airflow device 19900 flowing over the evaporator 19100 and then optionally over another energy storage of a rich media type (e.g., liquid or solid desiccant) 40.4 providing enhanced dehumidification within the CAS. In this instance, the energy storage 40.4 can be regenerated externally of the integral DMA 11000.1 by transferring the rich media (rich is a relative term as known in the art relative to weak for liquid absorber such as water vapor absorption) through the transfer port 11100 to a second DMA operating as a service type repositionable asset 11000.5. As depicted this second DMA 11000.5 transfers weak fluid from energy storage 40.5 after removing the rich fluid from energy storage 40.4. Alternatively, though not shown, is a first service DMA removes the rich fluid and a second service DMA replaces the rich fluid with weak fluid. When the CAS is in heating mode, analogous to the condenser in thermal communications with energy storage system, the evaporator 19100 is in thermal communications via a thermal diode 19301.2 to an energy storage of the thermal type 40.3 (and preferably a phase-change material) which can be optionally utilized for exemplary refrigeration in another location within the reconfigurable building structure whether in the same or different CAS.

Yet another advantage of the DMS is a reduction of maximum design electrical current, therefore enabling the utilization of low-voltage wiring within static positioned assets particularly those in structural communication with the host building structure. Decoupling electrical energy storage from the physical infrastructure into DMAs maximizes system flexibility to both maximize revenue due to rapid reconfiguration of physical space and minimizes cost to reconfigure in the less frequent instances of tenant turnover (a.k.a. tenant buildout). This capability further reduces upfront capital infrastructure costs that otherwise demand a design to worst-case scenario rather than actual demand. In a static infrastructure environment, the incremental cost of adding capacity is so high that design engineers and architects just over design, especially when full tenant occupancy is not yet achieved to increase the probability of getting a first tenant. A particularly preferred DMS utilizes DC power extensively, and a specifically preferred DMS eliminates AC power distribution within all interior spaces of the DMS (or better yet in its entirety). Further shifting the power supply to within a DMA, hereinafter referred to as a Power DMA, having hydrogen as the fuel source and preferably a fuel cell for DC power generation inherently enables a lower voltage due to the short distance between power generator and power consumer therefore reducing power losses due to voltage driven power conversion. A multifunctional Power DMA when integrated into a wall of furniture enables the relatively high-pressure hydrogen storage tank to be utilized as a structural element within the wall or furniture.

A first DMA has at least one functional task "Functional Task" that includes: a) air modulation whether it be cooling (a.k.a. air conditioning), heating, ventilation, dehumidification, humidification, filtration, decontamination "HVAC-Plus"; b) lighting; c) energy storage whether it be electrical, thermal, chemical; or d) product staging (i.e., placement of an inanimate object) to empower a functional task by either the staged product being moved to a second position or becoming in functional communication to a second DMA in order for the second DMA to accomplish its functional task enhanced or enabled by the presence of the first DMA when in functional communication with the second DMA all within a controlled atmosphere space "CAS" such that a CAS has at least one Functional Task regulated or modulated by at least an actuator or switch including where the actuator or switch responds to a feedback control loop and/or preferably also a feedforward control loop in conjunction with the feedback control loop.

The inventive DMA has the optional and preferred capability of having an integral docking capability between a first functional portion of the DMA (such as to execute the Functional Task) in combination with a swappable second support portion of the DMA (such as electrical energy storage) such that DMS can either coordinate the movement of the DMA first portion with the DMA second portion concurrently (meaning the DMA first portion is at least in structural communication with the DMA second portion) or preferably where the DMA first portion is also in functional communication with the DMA second portion. One exemplary instance is the first portion being an air filtration with integral air decontamination device and the second portion being an electrical energy storage device. It is understood within the context of the invention that the electrical energy storage can be a second DMA such that the electrical energy storage device component within the second DMA can support multiple DMAs though only one at a time enabling the roaming electrical energy storage DMA to not become dormant due to time of day, seasonal, or scheduled events variations. In other words, the DMAs operate at a higher utilization functional factor rate.

Another embodiment of the inventive DMA can be a semi-passive device such as a radiant cooler or heater in which the DMA is in thermal communication with a thermal energy storage portion through a thermal spreader to become a radiant emitting source or radiant absorber within the physical space of the CAS that the DMA occupies to respectively heat or cool the CAS. Such a device has a defined at least 2-dimensional radiant emitting i.e., source (or absorbing i.e., sink) surface to impact the temperature within the geofence therefore again reducing the requirement of stationary air ducting on the DMS. It is further understood that such a radiant DMA combined with onboard thermal energy storage reduces electrical energy storage demands by at least 20% (and preferably at least 50%, and particularly preferred by approximately at least 80%).

The inventive use of a DMA for radiant heating or cooling has the fundamental advantage of: a) reduced distance between radiant surface and the occupant(s), as compared to traditional non-DMA use of radiant surfaces that are both stationary as well as mounted to fixed structural elements at substantially further distance from the occupants demanding higher temperature differentials also creating distance requirements for safety purposes; b) personalization of comfort to a much smaller physical space, thus reducing the otherwise places of overcooling and overheating to accommodate personal preferences beyond the overarching building setpoints; c) substantially lower energy consumption for the same level of occupant comfort; d) fast response times as well as switching times between heating and cooling modes; e) arguably the most important feature is the substantial reduction of fixed and rigid ducting in order to otherwise provide occupant comfort; and f) in a post-pandemic climate a "radiant energy" DMA reduces by at least 10% (and preferably at least 20%, and specifically preferred at least 70%) the air cross-contamination between occupants in the DMS.

Figure 13:
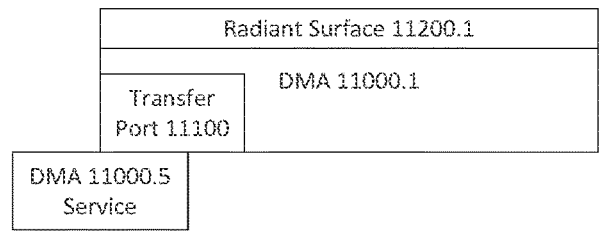
FIG. 13 is a top view of the repositionable assets of both an operating type and also a service type.

Turning to FIG. 13, FIG. 13 depicts a DMA 11000.1 having a transfer port 11100 in which any solid or liquid relevant to the operating function is transferred into the DMA or removed out of the DMA. In this instance as depicted the solid or liquid is in thermal communication with a radiant surface 11200.1 enabling the DMA to bring in much closer (at least 10 foot, preferably at least 5 feet, and particularly at least 3 feet) to any occupant within the CAS providing the known benefits of proximity for radiant heating or cooling. The onboard presence (though not shown this figure) of energy storage system of thermal type, and preferably also energy storage system of electrical type, enhances the comfort for occupants within the CAS and importantly enables true personalization to the occupants in closest proximity all while providing substantial energy savings of at least 5% as compared to energy consumption within the CAS without the inventive DMA having an onboard radiant surface 11200.1 It is further shown that a DMA of a service type 11000.5 provides the means to replace the spent thermal energy storage media with fresh thermal energy storage media (e.g., if providing radiant cooling, preferably replacing warm media having undergone phase change with solidified cold media, or vice versa if providing radiant heating).

A critical operation within a CAS, of more importance particularly in the pandemic era, is the need to decontaminate a physical space in which space occupation has taken place (i.e., the potential exists for air cross-contamination). The decontamination requirement includes both physical surfaces of the stationary components as well as the DMA as well as air within the spaces in between stationary components as well as spaces that are a space subset created because of the DMA partitioning the overall physical space. The DMS has two additional operating modes with respect to DMA position in the particularly preferred embodiment, first is a decontamination positioning mode and the second is a cleaning mode. The decontamination positioning mode utilizes the feedforward portion of the control system to predict contamination pathways and contamination loading based on projected occupant pathways and time presence, and then to calculate the position of at least one DMA to minimize contamination exposure amongst occupants. The cleaning mode operates in two distinct sub modes, the first being a proactive calculation of DMA position such that both minimizing cross-contamination takes place and then also minimizing cleaning asset utilization to properly decontaminate the DMAs. The DMS utilizes the feedforward control portion to maximize occupant safety by placement of the DMAs to establish a sufficient physical space to perform all the scheduled (or projected) functional tasks within the physical space concurrent with DMAs creating air flow partitions within the physical space accounting for additional DMAs that serve as temperature and humidity controllers with their resulting air flow vectors impacting potential cross-contamination amongst occupants. The physical position of the DMA (including angle and not just center of gravity position in 2-D or 3-D relative to the entire physical space) then sequentially is modified within the allowable geofence positions accounting for DMA cleaning pathway. It is optimally understood that cleaning assets are also additional DMAs beyond the DMAs that partition the space whether be walls or furniture. The preferred cleaning DMAs contain on-board decontamination equipment as known in the art, though the particularly preferred cleaning DMA doesn't leave any residual on the surface or air to be decontaminated which includes as known in the art as ultraviolet for surface decontamination, ozonated (or electrically charged) water, or plasma activated air. It is a fundamental feature of the dynamic digital twin that placement of DMAs can be optimized for a first mode and then at least one DMA can be repositioned for a second mode, or the preferred dynamic digital twin utilizes feedforward simulation to determine a placement of DMAs to minimize the necessity of DMA movement after the first mode and prior to the second mode of operations. The particularly preferred DMS calculates the positioning of cleaning DMAs and their pathway during cleaning operations accounting for feedback parameters indicative of contamination profile and then to establish a next DMA position based on feedforward projections to determine position where the priority for cleaning DMAs to perform their functional tasks in accordance with past activity within the operational geofence as historically archived by using aforementioned cameras. Camera in the inventive system is any method to capture a visual image to determine the placement of DMAs within the DMS, including, as known in the art, radar, lidar, infrared sensors, etc. The capturing of the visual image results in an at least 2-dimensional image (top down) view of all assets within the DMS including the current position of DMAs. The control system in particular provides position and orientation within the 2-dimensional image at the correct X,Y coordinates, and particularly also provides the position of Transfer Ports on their respective DMAs in addition to emitting direction of any onboard radiant DMA.

Figure 15:
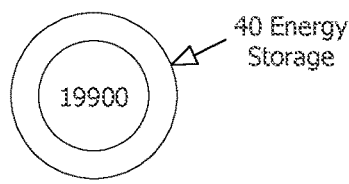
FIG. 15 is a top down view of a high-G force air decontamination device utilizing energy storage medium as a shroud for safety and noise abatement purposes.

Yet another embodiment of the inventive DMA comprises a high-gravity force air decontamination, whereby the high-gravity force exceeds 3 times the force of gravity (and preferably exceeds 10 times the force of gravity, and specifically preferred exceeds 1000 times the force of gravity) to inactivate pathogens virtually instantaneously within the immediate vicinity of the DMA. This DMA is referred to as "Decontaminant DMA" is optimally configured such that airflow device creating the high-gravity force is shrouded by the onboard energy storage device serving both to reduce emitted sound exposed to the occupant(s) and protecting occupants(s) against structural failure of the high-speed fan blades required to generate the high-gravity force. A repositionable Decontaminant DMA dynamically enables a larger CAS to effectively be segmented into at least two smaller CASs reducing cross-contamination between the at least two smaller CASs by at least 80%. The utilization of the high-gravity force airflow device reduces the otherwise large volume required for either ultra-violet disinfection or HEPA filters respectively requiring longer residence times or lower air velocities to reduce pressure losses. The size advantage of the inventive Decontaminant DMA further enables it to be contained within a reconfigurable wall or repositionable furniture therefore becoming a multifunctional DMA. Turning to FIG. 15, FIG. 15 depicts a high-gravity force airflow device 19900 surround by an energy storage system 40. The utilization of the energy storage system then becomes inherently and strategically multifunctional as the energy storage system 40 first becomes a structural shroud against explosive structural failure of the airflow device itself, as it is recognized that achieving high-gravity force requires high rotating speed of at least 1000 rotation per minute "RPM", preferably at least 10000 RPM, and particularly preferred at least 30000 RPM. The energy storage system 40 further serves as a noise abatement function so as to reduce the noise emission profile emanating into the approximately immediate vicinity in which the DMA is located.

Yet another embodiment of the inventive DMA can be a semi-passive device such as a lighting reflector in which the DMA is in optical communication with a lighting source portion emitting light that is at least redirected to the lighting reflector to provide visual lumens within the physical space geofence that the DMA occupies as characterized by an optical geofence OPT (t). The OPT (t) typically changes not only from dynamic positioning and modulation of onboard functional task BUT also due to changes in ambient lighting conditions (e.g., intensity of natural light, and/or color spectrum, or combinations of both). Such a device has a defined at least 2-dimensional optical emitting i.e., source (or absorbing i.e., sink) without requiring any significant electricity source.

Multiple embodiments of the inventive DMA as a Lighting DMA exist to make light emitting sources at best void of electrical communications with fixed conduit in structural communications with stationary structural components of the DMS, or using a Lighting DMA comprised of a light reflective surface that is positioned by a Service DMA where the light source is on a second DMA or at worst is at a position closer to the perimeter of the CAS relative to the position (closer to the interior of the CAS, and further away from the perimeter of the CAS) of the first DMA having the light reflective surface. The particularly preferred embodiment of the Lighting DMA is further comprised of an actuator to steer a collimated light source on a first DMA to a second DMA having a light reflector such that the control system places the position and orientation of each DMA so that the light flux is precisely reflected to achieve the desired lumen intensity and profile within the CAS. The specifically preferred embodiment of the Lighting DMA positions within the DMS such that Service DMAs and/or at least one second DMA have minimal impact on disturbing the light distribution resulting from movement of the Service DMAs or at least one second DMA from a first position to a second position, such that Service DMAs or at least one second DMA has a clear movement vector relatively external to the light transmission between the light source and the light reflector.

Another inventive embodiment of the DMA can be a semi-passive device such as a moisture vapor adsorber (or absorber) in which the DMA is in humidity (i.e., moisture vapor) communication with an air circulation source portion pulling or pushing air flow to dehumidify the air from within the geofence in which the DMA occupies as characterized by a humidity geofence HUM (t). The HUM (t) typically changes not only from dynamic positioning and modulation of onboard functional task BUT also due to changes in ambient environmental conditions (e.g., relative humidity of natural fresh air, or combinations of humidity and temperature). Such a device has a defined at least 2-dimensional humidity map i.e., source (or absorbing i.e., sink) while requiring substantially lower electrical power consumption.

Yet another inventive embodiment of the DMA can be a semi-passive device such as a $CO_2$ adsorber (or absorber) in which the DMA is in $CO_2$ (i.e., $CO_2$ as generated by occupants within the DMS) communication with an air circulation source portion pulling or pushing air flow to decarbonize the air from within the geofence in which the DMA occupies as characterized by a $CO_2$ geofence $CO_2$ (t). The $CO_2$ (t) typically changes not only from dynamic positioning and modulation of onboard functional task BUT also due to changes in ambient environmental conditions (e.g., number of occupants, relative humidity of natural fresh air, or combinations of humidity and temperature). Such a device has a defined at least 2-dimensional $CO_2$ map i.e., source (or absorbing i.e., sink) while requiring substantially lower electrical power consumption. A particularly preferred embodiment of the $CO_2$ adsorber (or absorber) is the ability to decontaminate the air also of volatile organic compounds "VOCs" and act as a filter against any pathogens in the air. The inventive combination of interior water electrolysis by an electrolyzer yielding oxygen as a byproduct of hydrogen, the removal of air contaminants, and the removal of $CO_2$ from the conditioned air within any CAS within the DMS has the particular benefit of reducing fresh air exchange. In other words, the empowering aspect of distributed energy storage enables the fundamental transformation of virtually any CAS to operate with self-sufficiency and air isolation analogous to a spaceship. This leads to a further enhancement of the inventive DMS due to the potential for elimination (or at least greater reduction) of fixed ducting. Reconfigurability of the inventive DMS is optimized further by any reduction of fixed ducting. It is understood that a DMA outfitted with a) $CO_2$ and VOC adsorber, b) water electrolyzer, c) hydrogen fuel cell, and d) airflow inlet and emitter post adsorber is virtually self-sufficient apart from the extremely easy and cheap storage of water. Such an inventive DMA optimizes the flexibility, reconfigurability, and air quality of the inventive DMS.

Figure 10:
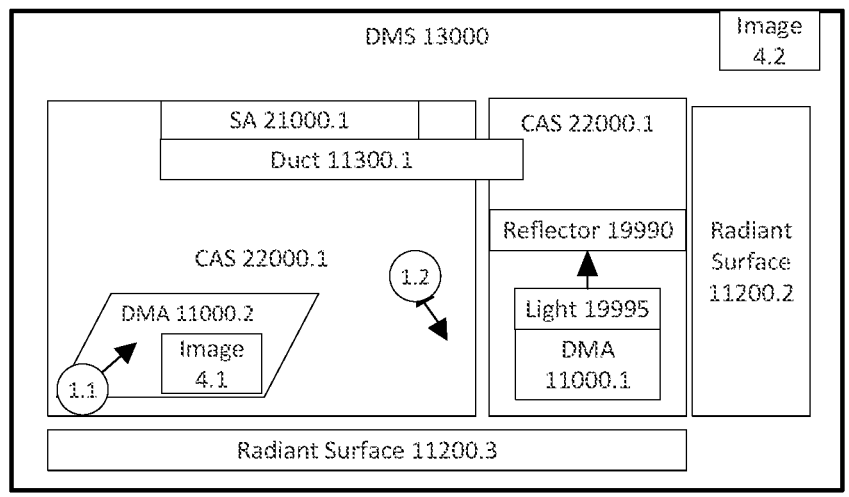
FIG. 10 is a top view of the reconfigurable building structure with a focus of repositionable assets of the environmental type.

Turning to FIG. 10, FIG. 10 depicts the DMS with multiple DMAs all within two distinct CASs. In this embodiment, the DMS has a stationary asset 21000.1 (e.g., an variable volume airflow device over a heat exchanger) in thermal communication through a duct 11300.1 (that is much smaller due to leveraging radiant surfaces 11200.2 and 11200.3 as depicted, and as not shown in this figure additional optional radiant surfaces on a DMA) for environmental control within the CASs 22000.1 and CAS 22000.1 respectively provided increased ability to meet distinct setpoints within each CAS. In addition, this figure depicts the benefit of having an onboard light source 19995 that emits light either directly into the CAS or indirectly by reflecting the light first onto a reflector 19990 (in this instance as shown as being stationary, though it is understood the reflector can be a device that is mobile via another DMA). This inventive feature enables maximum flexibility of lighting within the CAS thus meeting the demands on distinct operating functions in each CAS as a function of time, thus achieving high utilization factor particularly of specialized lighting devices. Finally, this figure depicts a first location 1.1 with orientation as indicated by the vector off and a second location 1.2 with its respective orientation vector in which a DMA is repositioned. It is understood that the location and orientation can be virtually anywhere on a two-dimensional geofence representation of the CAS within the DMS (or preferably on a three-dimensional geofence) for superior digital twin modeling of all critical operating and environmental functions.

A summary characterization of functional tasks for DMAs includes humidity sinks and sources, lighting sources and sinks (i.e., reflectors, splitters, spectrum converters), air decontamination, temperature including radiant sinks, radiant sources, thermal energy storage, logistics, etc. It is understood that semi-autonomous roaming power generating, or energy storage devices can support the aforementioned functions notably to optimize the utilization factor of the relatively heavy and expensive energy storage capabilities, or that functionalities can be combined such that it becomes a multifunctional Power DMA.

The inventive DMS first needs to create a projected at least 2-dimensional "2D" parameter geofence "PG (t), though preferably 3-dimensional "3D" parameter geofence. The PG (t) in a specifically preferred embodiment considers variations of projected external to DMS environmental conditions (e.g., weather including sun intensity and angle and wind speed along with temperature, relative humidity). It is anticipated that the modeling of light intensity within the CAS is also provided as a function of time considering natural light available, preferably within a 3-dimensional geofence model, in correspondence to weather as well as time of day hereinafter referred to as Natural Light Supply (t). The scheduled operating functions required to support occupant activities creates a Light Demand (t), preferably within a 3-dimensional geofence model, such that the inventive DMS control system calculates the lighting deficiency beyond the available natural light and therefore calculates the placement position and orientation of Lighting DMAs within the CAS. This then triggers the DMS control system to calculate the required onboard power consumption as a function of time, then subsequently leading to a schedule of Service DMAs to replenish the electrical capacity of the Lighting DMAs to always ensure adequate supply of light preferably without lighting service interruptions. The combination of the proper Lighting DMA lighting capacity with sufficient onboard power energy storage at the specified position and orientation is validated for structural integrity according to the tributary load geofence (t) and dead load geofence (t) within the DMS for the respective CAS. Failure to stay within the structural design loads always leads the control system to identify a Lighting DMA with a lower power energy storage capacity to reduce the total weight of the Lighting DMA and therefore reduce the tributary and dead loads on the DMS. This same iterative process is used for environmental DMAs but based on first occupant comfort factor and then individual environmental parameters as a function of time. The PG (t) in a particularly specific preferred embodiment additionally considers variations of projected internal loads within the DMS and their respective impact on each parameter. Once PG (t) is determined, the DMS then determines which DMA of the available pool of DMAs are available and capable of meeting the load demand of PG (t) also considering static stationary assets "SSA" (each having its respective operating specifications and envelope "OSE"). It is understood that each DMA has its own OSE as well. The DMS calculates and determines the incremental load requirements beyond the capabilities of the SSA within the geofence that the SSA serves (i.e., a 2D or 3D PG (t) is created for each SSA as well). The incremental load requirement is the roaming parameter demand geofence "RPDG (t)" for which the DMS then needs to determine physical placement of each DMA available from the pool of DMAs. It is a fundamental feature of the invention that mission critical parameters are served both by static stationary assets SSAs and roaming DMAs, and that the determination of at least placement position or real-time operating envelope is a function of a feedforward control loop that considers future variations of parameters on both a supply and demand basis.

The inventive DMS then needs to validate and verify that the placement of each DMA maintains the structural integrity of the DMS, safe egress particularly in the event of emergency conditions, safe and efficient travel lanes for roaming DMAs both with respect to the DMAs themselves as well as personnel occupants of the DMS within the sphere of influence of each DMA. A further feature of the DMS is that the structural integrity of the DMS considers that the structural loads within an operating DMS vary over time and that virtually always the DMS has spare structural capacity to support at least one DMA though specifically preferred a pool of DMAs to be dynamically positioned within the DMS. As noted, DMAs particularly when needing to have both decoupled functional storage capacity as well as electrical power to execute its Functional Task each DMA has a significant impact on tributary load and dead load on an aggregate basis of the DMS. Always maximizing structural capacity and maximizing utilization factor to execute aggregate of Functional Tasks requires both SSAs and DMAs, and particularly preferred DMAs that are capable of being dynamically positioned and functionally decoupled from their respective SSAs.

Safe and effective operations requires the inventive DMS to operate in the preferred method of operations such that the system validates in sequential order the following: a) structural integrity as f(t) creating a structurally safe geofence f(t) "SSG(t)", b) egress integrity as a subset of the SSG(t) becoming a "SSGE(t)" c) functional integrity as a subset of the SSGE(t) creating a functional geofence SSGEF(t) to then drive a position optimization control series for each of the pre-determined DMAs available from the pool of DMAs to achieve its Functional Task creating a SSGEFP(t), d) network integrity as a subset of SSGEFP(t) to create a SSGEFPN(t) that accounts for the movement of at least one second DMA performing Transfer Task(s) to enable docking with a first DMA performing its Functional Task(s), and lastly e) aggregate system integrity creating a feedforward setpoint profile for each DMA at its now determined position FSPDMA(t) taking into account the movement of at least one third (not in functional communication) DMA to enable safe and efficient passage of all DMA projected movements within the range of time for which the DMA position is being staged for. The now positioned DMA utilizes both a feedback control loop FBDMA(t) and the feedforward setpoint profile FSPDMA(t).

DMAs within the interior of the DMS are referred to as operating within a controlled atmosphere space having as noted before an at least 2-dimensional (though preferred 3-dimensional) feedforward geofence load profile as a function of time "FLDMSP(t)" for each parameter being monitored and controlled. The function of time is calculated based on a precisely determined setpoint condition (or projected setpoint condition), projected load demand with its respective position within the geofence (e.g., person occupying space creating a thermal heat source and humidity source as well as an air contamination source, DMA occupying space performing lighting therefore creating a thermal heat source as well as a light source, etc.). The particularly preferred FLDMSP(t) leverages real-time occupancy sensors to account for deviations between the projected FLDMSP(t) and actual FLDMSP(t) to create future variations and adjustments to the projected FLDMSP(t), leading to an updated projected FLDMSP(t) and therefore an updated schedule for deployment of DMAs into their respective positions within an assigned projected FLDMSP(t). Any non-assigned DMA from the pool of available DMAs is subsequently free to be deployed to perform External Tasks (which in most cases will be equivalent to tasks performed at a Renewal Position). The feedforward control loop in approximately all scenarios prioritizes achievement of Internal Task with minimal deviation from setpoint conditions over virtually any External Task regardless of deviation from setpoint conditions.

Turning to FIG. 10 depicts the DMA as a visual image projector onto a surface preferably for personalization of the physical interior space, where this embodiment replaces each instance of the image sensor 4.1 (i.e., camera) with an image projector, and each instance of the reflector 19990 with a projected image. The DMA of the projector type is further comprised of a camera preferably onboard the DMA and in wireless communication with the DMS. It is understood that the camera can in fact be stationary and located such that the camera calibrates at the very least the focal point of the image onto the surface in which the image is projected onto, hereinafter referred to as the "receiving surface". In a particularly preferred embodiment, the receiving surface is onto another DMA (e.g., a reconfigurable wall) where the first projecting DMA is optimally placed to provide an optimally focused image onto the receiving surface. In this instance the visual image being projected provides personalization of the receiving surface yet the DMS must recalibrate the focal distance, the potential overlapping of images being projected when multiple DMAs are projecting images onto the receiving surface, and even In the instance when the projecting image is onto a receiving surface that is not precisely perpendicular to the projector therefore creating image distortion that needs to be accounted for leading to the projector in combination with the DMS altering the image to account for the non-perpendicular angle between the projector and the receiving surface. It is further understood that the receiving surface can also be a non-flat surface in which the non-flat surface itself can be reconfigured to a varying non-linear shape. It is therefore the responsibility of the at least one camera to provide feedback and calibration to the DMS such that the projected image being projected by the projector is modified to achieve the visual image on the receiving surface. The same camera (or set of cameras) serves at least two functions where the DMA (receiving surface) actual position and actual angle is calculated relative to the camera and therefore this information becomes part of the sensing mechanism for accurate representation in the digital twin. And finally, the accurate representation in the digital twin enables a wide range of accurate modeling for temperature, decontamination control, and/or lighting control. The same camera after establishing the accurate digital twin model can then serve as an occupant motion sensor in fact with the additional benefit of calculating occupant movement pathway. The occupant movement pathway is missional critical to determine the optimal decontamination requirements because the occupant movement additionally includes surface and air contamination vectors. As such the inventive DMS has the camera operating in at least two distinct modes of operation, the first mode (hereinafter referred as calibration mode) in which the DMS calculates the precise position (including orientation angle) of the DMA (receiving surface) for precise DMA representation in the digital twin and the second mode (hereinafter referred as occupant motion mode) utilized to control air flow, lighting levels and direction, cleaning pathway and scheduling, fresh air exchange requirements, etc. A particularly preferred camera has at least two different meta-lens in which the DMS regulates which of the meta-lens is required to fulfill the proper functioning for the then current camera mode. The multiple meta-lens enables the camera to optimally switch between each mode such that the meta-lens position is changed relative to the camera and therefore the camera itself doesn't need to move relative to the DMA while the camera can also be flush either on a stationary position or integral to a reconfigurable movable DMA. It is anticipated that the inventive DMS can utilize virtually any camera, whether mounted permanently to the DMS or roaming on a repositionable DMA to establish the position and orientation of other DMAs or relative position and orientation between the host DMA and the receiving surface of the DMS. It is also anticipated that the image projector within the inventive DMS can utilize virtually any image projector as known in the art, whether mounted permanently to the DMS or roaming on a first repositionable DMA to project an image or light onto a second DMA or onto a receiving surface of the DMS.

Turning to FIG. 10, FIG. 10 depicts the DMS with multiple DMAs all within two distinct CASs. In this embodiment, the DMS has a stationary image sensor 4.2 (e.g., camera) to aid in the establishment of precise location of each DMA (and preferably each occupant) minimally in relative position to stationary objects within the DMS along with at least one mobile image sensor 4.1 such as onboard of DMA 11000.2.

A preferred embodiment of the DMA further comprises visual indicators based on orientation of the DMA relative to DMS including a static emergency egress pathway. The preferred visual indicator shows a green light for personnel occupants within the space viewing the DMA's visual indicators when concurrent with the personnel occupant direction towards the desired static emergency egress pathway, or a red light for personnel occupants within the space viewing the DMA's visual indicators when concurrent with the personnel occupant direction opposite of the desired static emergency egress pathway. Positioning of the visual indicators can be at approximately floor level, approximately eye level, or approximately ceiling level (or of course in multiple positions concurrently) in accordance with DMS norms within the DMS regulatory requirements or solely DMS regulatory requirements.

Figure 12:
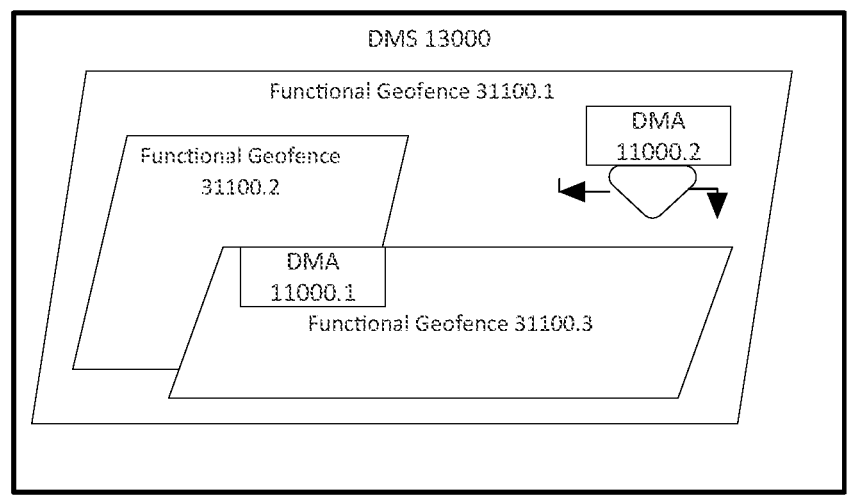
FIG. 12 is a top view of the reconfigurable building structure with functional geofences depicted in a two-dimensional manner.

Turning to FIG. 12, FIG. 12 depicts for DMA 11000.2 the representation of alternating green and red lights where the left arrow represents exemplary view of red lights for any occupant looking at the DMA from left of the respective DMA and where the right arrow represents exemplary view of green lights for any occupant looking at the DMA from right of the respective DMA.

It is understood as a feature of the system that placement position, the relative orientation angle placement position, the height of the DMA, the provisioning of transparent segments within the total height of the DMA (and particularly preferred also taking into account the height and size of the transparent segment as a further function of the total height of the DMA), the relative position of a first DMA to at least one second DMA, and the relative position of the DMA to static stationary assets "SSA" within the DMS are specifically preferred when calculating the position and angle of each DMA within the DMS and relative to each other DMA and SSA.

Yet another inventive feature of the DMS is the ability to utilize at least two cameras (with each camera having approximately real-time position and directional vector relative to known SSAs within the DMS to precisely determine the approximately precise position and relative angle of each DMA. It is recognized that DMAs may change position over time as a result of personnel occupant usage or interaction with each DMA, or that movement of each DMA by maintenance personnel, personnel occupants, semi-autonomous DMA, or autonomous DMA to a new position benefits by known in the art triangulation through wireless communications means or particularly preferred by creating a 3-dimensional spatial representation by the combination of at least one stationary camera with a known approximately precise first position and first camera vector direction with at least one roaming camera onboard an at least one DMA where the at least one DMA is in wireless communications to DMS such that the aggregate of the multiple camera images with each known position and angle vector enables the creation of an approximately high-precision 3D mapping of all SSAs and DMAs within the geofence such that this resulting mapping provides a dynamic and real-time digital twin. It is further recognized within the method of determining each position and vector of each DMA can be a combination in which the DMA becomes into a now currently unmovable position and/or each position and vector of other DMAs is both first optimized in terms of placement and vector and then secondly generates DMA movement event schedule providing both time requirements for each respective DMA to be moved into a new position and a new vector, which then either generates a list for manual movements by maintenance personnel or instructions to another DMA to execute Transfer Tasks, etc.

The particularly preferred embodiment of the invention is a dynamic digital twin which approximately continuously updates to reflect the then current real-time position (or projected position) of at least one DMA within the DMS. The dynamic digital twin has a real-time objected oriented configurator in which each DMA within the DMS is dynamically linked to a physical space (represented by a geofence object) within the DMS and represent movement vectors of the DMA into or out of the respective geofence object (and therefore DMA is object linked or unlinked respectively to the appropriate geofence). It is understood that movement vectors preferentially include speed in addition to direction. And finally, in which the feedback control loop and the feedforward control loop for each DMA utilizes object-oriented rules that are specifically a function of the geofence (s) in which the DMA resides in. The inventive system features (and must require) approximately precise position (in virtually all instances position is both position and orientation within the DMS) contextual awareness for each DMA within the DMS to make accurate functional operational decisions (for each parameter and its respective setpoint) without requiring human intervention and reprogramming for any movement of any DMA from a first position to a second position. This is of particular importance when the DMA is in fact a part of the otherwise traditional stationary infrastructure that critically provides (and uses energy to operate its Functional Task) at least one of air environmental management, lighting management, or energy storage management all being functions in a traditional prior art system being static and reflected also in a static digital twin model (with best-case minor modifications to reflect deviations of as-built conditions compared to design specifications). Safe, efficient, and effective operations of any DMS or CAS requires a digital twin that is always accurate. And the dynamic positioning of DMAs within the DMS with optimal asset utilization and energy efficient operations also requires a digital twin that is integrated with a feedforward control loop to determine optimal positioning of each DMA. Finally, the accurate DMA enables management of each mission critical parameter including the allocation of functional performance between all SSAs and any or all DMAs. The feedforward control loop enables the functionality of the DMS to be maximized by utilizing the feedforward control to optimally utilize the DMS structural capacity and SSA design capacity for high utilization factors and then therefore accelerated return on investment.

The inventive DMAs within the DMS is anticipated to include additional functionality such as logistics to move inventory stored temporarily within the DMS or to reposition assets utilized on a more permanent basis within the DMS. As noted, these DMAs have the similar characteristics of being load bearing on the tributary as well as dead loads of the DMS. Their respective positions do need to be accounted for as they impact occupant movement, sounds heard by occupants, needs to be renewed by Service DMAs, emergency egress, thermal loads on the CAS within the DMS, shading impact on occupants' visual sight. The DMS must ensure the safety of all DMAs whether they provide infrastructure functions or service functions within the DMS. Therefore, the DMS preferentially coordinates and orchestrates all DMA movements. Each DMA movement impacts the DMS structurally and utilizes at varying and dynamic rates the inherent structural capacity of the DMS. Virtually all DMAs impact airflow, thermal load, light flux, and occupant traffic flow, combined have direct and indirect demands for Internal Tasks within the DMS.

The inventive feedforward portion of the control system coordinates the scheduling of at least the infrastructure functions and the position with orientation of the DMAs capable of fulfilling those respective functions. And the particularly preferred embodiment of the inventive feedforward portion of the control system includes the coordination of DMAs capable of performing External Tasks within the DMS concurrently with the DMAs capable of performing Internal Tasks.

The inventive system is anticipated to be available at multiple levels of service capability. The first level of service enables the placement of functional DMAs to meet operational parameters as a function of time supported by a fleet of Service DMAs to always ensure adequate electrical capacity to fulfill the DMA function (limited to Internal Task) within the CAS concurrent with always maintaining a) tributary and dead loads below design limits, and b) transfer port access by Service DMAs without sacrificing safe egress. The second level of service further enables the optimized movement of functional DMAs where the operational parameters are impacted by external weather and therefore include high-precision climate modeling of wind, solar intensity, temperature, and humidity, etc. for calculating the dynamic and varying impact on environmental parameters within the CAS. The third level of service further includes the provisioning of dynamic and varying functions within the CAS as a function of time. The fourth level of service further includes the provisioning of an additional set of DMAs to perform External Task(s). Yet another service option minimizes air cross-contamination amongst the control tasks required to support environmental parameters and occupant comfort beyond a baseline safety level.

Fundamental requirements, including on a recursive basis until a viable positioning of functional assets leveraging onboard energy storage. 1) Placement of heavy assets performing Internal Tasks "Internal Assets", due in large part to energy storage, must always ensure structural integrity. The temporary placement of these heavy assets can then be supplemented by additional assets performing External Tasks "External Assets" whether these External Assets are either temporarily placed at positions that still maintain structural integrity or take a pathway through a Structurally Safe Geofence updated based on the aggregate of Internal and External Assets with their respective positions. 2) Placement of each of the assets selected from the aggregate Internal and External Assets must always be in a position to maintain safe egress. The accounting of safe egress updates the Structurally Safe Geofence to be a subset as Safe Egress Geofence. 3) Final placement of each of the assets is based on optimization function for the specific functional task within the Safe Egress Geofence creating a Safe Optimized Geofence which is a subset of the Safe Egress Geofence. 4) System coordinates Service Assets to maintain performance of first the Internal Assets and then External Assets, working within preference of maximum occupant avoidance. And 5) System continues to update placement of Internal Assets based on updated weather data, occupant demands, etc. Service Assets are dispatched to move Internal Assets from their current position to any new optimized position.

Turning to FIG. 12, FIG. 12 depicts a representation of distinct functional geofences (e.g., safe egress, acceptable service DMA pathway, occupant specialized areas, etc.) within the DMS 13000. In this embodiment a first functional geofence 31100.1 has a subset second functional geofence 31100.2 and a subset third functional geofence 31100.3 where the overlap utilizing a rules-based logic associated with asset movement control system determines a viable location for the DMA 11000.1

The Weather environmental (t) is a control engine that yields a multi-dimensional (at least two, preferably three) model as a function of time in which at least one parameter (and preferably all of the following) selected from the group of wind, wind direction, temperature, relative humidity, solar intensity, and solar flux direction.

Another Weather environmental impact on DMS (t) control engine that yields a multi-dimensional (at least two, preferably three) model as a function of time in which at least one parameter (and preferably all of the following) selected from the group of wind, wind direction, temperature, relative humidity, solar intensity, and solar flux direction so as to determine the thermal load on DMS (t). It is understood that all instances of "(t)" indicate the preceding is a function of time, meaning the values vary over time.

Yet another Weather structural impact on DMS (t) control engine yields a multi-dimensional (at least two, preferably three) model as a function of time in which at least one parameter (and preferably all of the following) selected from the group of snow accumulation, wind, wind direction, temperature, relative humidity, solar intensity, and solar flux direction so as to determine the tributary load and dead load on DMS (t).

Another Weather light impact on DMS (t) control engine yields a multi-dimensional (at least two, preferably three) model as a function of time in which at least one parameter (and preferably all of the following) selected from the group of solar intensity and solar flux direction so as to determine the natural light availability into the DMS (t).

The following individual control engines, all a function of time, are represented as follows as DMS structural and infrastructure engines "INFE" 8705, DMS geofence operating engines "GEOE" 8710, or DMA functional engines "FUNE" 8715 all depicted within FIG. 4.

DMS Structural and Infrastructure Engines

Structural tributary load capacity on DMS (t)—control engine yields a multi-dimensional (at least two, preferably three) model as a function of time for the DMS's capacity to safely support tributary loads.

Structural dead load capacity on DMS (t)—control engine yields a multi-dimensional (at least two, preferably three) model as a function of time for the DMS's capacity to safely support dead loads.

Structural tributary load demand on DMS (t)—control engine yields a predictive multi-dimensional (at least two, preferably three) model as a function of time for the DMS's capacity to safely support tributary loads inclusive of DMA tributary load demand on DMS (t).

Structural dead load demand on DMS (t)—control engine yields a predictive multi-dimensional (at least two, preferably three) model as a function of time for the DMS's capacity to safely support dead loads inclusive of DMA dead load demand on DMS (t).

Aggregate environmental thermal demand by DMS (t)—control engine yields a predictive multi-dimensional (at least two, preferably three) model as a function of time for the DMS's thermal demand attributed to external and internal conditions in which thermal energy flows within the DMS.

Aggregate environmental power demand by DMS (t)—control engine yields a predictive multi-dimensional (at least two, preferably three) model as a function of time for the power demand by stationary and mobile assets specifically to execute functions involving environmental impact as characterized by Aggregate environmental thermal demand by DMS (t).

Aggregate non-environmental power demand by DMS (t)—control engine yields a predictive multi-dimensional (at least two, preferably three) model as a function of time for the power demand by stationary and mobile assets specifically to execute functions not involving environmental impact as characterized by Aggregate non-environmental demand by DMS (t).

Aggregate light demand by DMS (t)—control engine yields a predictive multi-dimensional (at least two, preferably three) model as a function of time for the lighting requirement as characterized by adequate lighting setpoints (t) to perform all predicted tasks occurring within the DMS.

Aggregate light power demand by DMS (t)—control engine yields a predictive multi-dimensional (at least two, preferably three) model as a function of time for the power demand by stationary and mobile assets specifically to meet the Aggregate light demand by DMS (t).

Aggregate noise signature by DMS (t)—control engine yields a predictive multi-dimensional (at least two, preferably three) model as a function of time for the noise generated throughout the DMS as characterized by operational setpoints (t) to perform their operational tasks occurring within the DMS and the corresponding noise signature as a function of its operational execution of their operational tasks.

Aggregate noise cancellation demand by DMS (t)—control engine yields a predictive multi-dimensional (at least two, preferably three) model as a function of time for the noise cancellation demand specifically to counteract the Aggregate noise signature by DMS (t).

Aggregate power limited noise cancellation demand by DMS (t)—control engine yields a predictive multi-dimensional (at least two, preferably three) model as a function of time for the noise cancellation demand specifically to counteract the Aggregate noise signature by DMS (t), though now derated to ensure power demand constraints are not exceeded.

Stationary environmental asset capacity (t)—control engine yields a predictive multi-dimensional (at least two, preferably three) model as a function of time for the stationary environmental assets in terms of thermal management capacity taking into account external and internal conditions in which thermal energy flows within the DMS.

Stationary power limited environmental asset capacity (t)—control engine yields a predictive multi-dimensional (at least two, preferably three) model as a function of time for the stationary environmental assets' in terms of thermal management capacity taking into account external and internal conditions in which thermal energy flows within the DMS, though now derated to ensure power demand constraints are not exceeded.

Stationary non-environmental asset capacity (t)—control engine yields a predictive multi-dimensional (at least two, preferably three) model as a function of time for the stationary non-environmental assets' capacity considering external and internal conditions in which functional performance within the DMS is executed.

Stationary power limited non-environmental asset capacity (t)—control engine yields a predictive multi-dimensional (at least two, preferably three) model as a function of time for the stationary non-environmental assets' capacity considering external and internal conditions in which functional performance within the DMS is executed, though now derated to ensure power demand constraints are not exceeded.

Stationary light asset capacity (t)—control engine yields a predictive multi-dimensional (at least two, preferably three) model as a function of time for the stationary lighting assets' capacity considering external and internal conditions in which functional performance within the DMS is executed.

Stationary power limited light asset capacity (t)—control engine yields a predictive multi-dimensional (at least two, preferably three) model as a function of time for the stationary lighting assets' capacity considering external and internal conditions in which functional performance within the DMS is executed, though now derated to ensure power demand constraints are not exceeded.

Stationary Feedforward Power Upper Limit (t))—control engine yields a predictive multi-dimensional (at least two, preferably three) model as a function of time for the stationary power generating assets' capacity considering external and internal conditions in which functional performance within the DMS is executed, though now establishing a power generating (and/or transmission) upper limit used within the feedforward control portion to ensure power demand constraints are not exceeded.

Occupant tributary load demand on DMS (t)—control engine yields a predictive multi-dimensional (at least two, preferably three) model as a function of time based on the predictive positioning of all occupants placing a structural tributary load on the DMS.

Occupant dead load demand on DMS (t)—control engine yields a predictive multi-dimensional (at least two, preferably three) model as a function of time based on the predictive positioning of all occupants placing a structural dead load on the DMS.

DMA Functional Engines

DMA Position (t)—control engine yields a predictive multi-dimensional (at least two, preferably three) model as a function of time for the placement position (e.g., both physical location and orientation angle relative to DMS) of DMAs excluding Service DMAs.

Service DMA Position (t)—control engine yields a predictive multi-dimensional (at least two, preferably three) model as a function of time for the placement position (e.g., both physical location and orientation angle relative to DMS) of Service DMAs.

DMA Feedforward Power Upper Limit (t)—control engine yields a predictive multi-dimensional (at least two, preferably three) model as a function of time DMA Feedback Operating Parameter Upper Limit (t)—control engine yields a predictive multi-dimensional (at least two, preferably three) model as a function of time for each of the DMA's functional performance operating setpoint upper limit.

DMA Feedback Operating Parameter Lower Limit (t)—control engine yields a predictive multi-dimensional (at least two, preferably three) model as a function of time for each of the DMA's functional performance operating setpoint lower limit.

Service DMA Scheduler (t)—control engine yields a predictive multi-dimensional (at least two, preferably three) model as a function of time for both task execution, notably Transfer Task execution through Transfer Ports to a specific DMA with a specific position such that the Service DMA's have coordinated movement from a first position to a second position.

Dynamic placement environmental asset capacity (t)—control engine yields a predictive multi-dimensional (at least two, preferably three) model as a function of time for the DMA environmental assets' capacity considering external and internal conditions in which functional performance within the DMS is executed.

Dynamic placement power limited environmental asset capacity (t)—control engine yields a predictive multi-dimensional (at least two, preferably three) model as a function of time for the DMA environmental assets' capacity considering external and internal conditions in which functional performance within the DMS is executed, though now derated to ensure power demand constraints are not exceeded.

Dynamic placement non-environmental asset capacity (t)—control engine yields a predictive multi-dimensional (at least two, preferably three) model as a function of time for the DMA non-environmental assets' capacity considering external and internal conditions in which functional performance within the DMS is executed.

Dynamic placement power limited non-environmental asset capacity (t)—control engine yields a predictive multi-dimensional (at least two, preferably three) model as a function of time for the DMA non-environmental assets' capacity considering external and internal conditions in which functional performance within the DMS is executed, though now derated to ensure power demand constraints are not exceeded.

Dynamic placement light asset capacity (t)—control engine yields a predictive multi-dimensional (at least two, preferably three) model as a function of time for the DMA lighting assets' capacity considering external and internal conditions in which functional performance within the DMS is executed.

Dynamic placement power limited light asset capacity (t)—control engine yields a predictive multi-dimensional (at least two, preferably three) model as a function of time for the DMA lighting assets' capacity considering external and internal conditions in which functional performance within the DMS is executed, though now derated to ensure power demand constraints are not exceeded.

DMA tributary load demand on DMS (t)—control engine yields a predictive multi-dimensional (at least two, preferably three) model as a function of time based on the predictive positioning of all DMA (including Service DMA) placing a structural tributary load on the DMS attributed to predictive DMA tributary load demand on DMS (t).

DMA dead load demand on DMS (t)—control engine yields a predictive multi-dimensional (at least two, preferably three) model as a function of time based on the predictive positioning of all DMA (except for Service DMA) placing a structural dead load on the DMS attributed to predictive DMA dead load demand on DMS (t).

Service DMA tributary load demand on DMS (t)—control engine yields a predictive multi-dimensional (at least two, preferably three) model as a function of time based on the predictive positioning of all Service DMAs placing a structural tributary load on the DMS attributed to predictive Service DMA tributary load demand on DMS (t).

Service DMA dead load demand on DMS (t)—control engine yields a predictive multi-dimensional (at least two, preferably three) model as a function of time based on the predictive positioning of all Service DMAs placing a structural dead load on the DMS attributed to predictive Service DMA dead load demand on DMS (t).

DMS Geofence Operating Engines

Structurally Safe Geofence (t)—control engine yields a predictive multi-dimensional (at least two, preferably three) geofence model as a function of time based on the load bearing capacity (accounting for both tributary and dead loads) depicting each (though separately for tributary and dead loads) additional carrying capacity on the DMS (t).

Safe Egress Geofence (t)—control engine yields a predictive multi-dimensional (at least two, preferably three) geofence model as a function of time based on the regulatory requirements to ensure safe egress of occupants (accounting for pre-determined stationary and DMA asset positions) within the DMS.

Safe Service DMA Geofence (t)—control engine yields a predictive multi-dimensional (at least two, preferably three) geofence model as a function of time based on the regulatory requirements and/or Service DMA proximity to assets and occupants to ensure safe Service DMA operations (accounting for pre-determined stationary and DMA asset positions, as well as now-determined DMA asset positions) within the DMS.

Occupant Proximity Avoidance Geofence (t)—control engine yields a predictive multi-dimensional (at least two, preferably three) geofence model as a function of time based on the regulatory requirements and/or DMS preferences to ensure occupant safety and comfort due to roaming Service DMA operations and/or DMA repositioning within the DMS.

Occupant Sound Avoidance Geofence (t)—control engine yields a predictive multi-dimensional (at least two, preferably three) geofence model as a function of time based on the regulatory requirements and/or DMS preferences to ensure occupant comfort through noise reduction attributed to roaming Service DMA operations and/or DMA repositioning within the DMS. The Occupant Sound Avoidance Geofence (t) includes the specific placement of at least one noise cancellation device positioned to diminish noise from within the DMS, roaming Service DMA(s), DMA(s) having specific onboard functions that themselves can create and emit a noise signature, and from infrastructure within the DMS. The preferred embodiment of the Occupant Sound Avoidance Geofence (t) varies also as a function of time due to the disbursement and placement of DMA(s) to a position that is optimized by the Sound Avoidance Engine, which optimizes the placement of DMA(s) having integrated noise cancellation device(s) to emit sound reduction waves, hereinafter also referred to as "Sound Control DMA", accounting for the then current (or projected) placement of other DMA(s) of all types. A preferred embodiment of the Sound Control DMA also has embedded and integrated sound absorbing materials (as known in the art) such that the DMA is further multifunctional. The placement of Sound Control DMA in terms of position and orientation is a function of time due to variations of operating functions within the geofence (e.g., conference rooms, bathrooms, bedrooms, exercise rooms, game rooms, etc.). It is understood that the placement of any DMA within the DMS will impact the noise profile as a function of time, whether that impact is due to onboard noise generators or onboard sound reduction methods, and therefore the Occupant Sound Avoidance Geofence (t) accounts for and optimizes the placement of DMAs of all types, as well as movement pathways of Service DMAs. The nature of the operating functions has a significant, and varying, noise emission profile as a function of time. Furthermore Air Cross-Contamination Segmentation Geofence (t)—control engine yields a predictive multi-dimensional (at least two, preferably three) geofence model as a function of time based on the predictive occupant(s) positions, placement of DMAs and stationary assets notably environmental assets within the DMS. This resulting geofence depicts logical partition segments in which air flow from one segment to another can be effectively reduced in order to reduce the probability of air cross contamination between different clusters of occupants within the DMS.

Environmental Parameter Feedback Setpoint Geofence (t)—control engine yields a predictive multi-dimensional (at least two, preferably three) geofence model as a function of time based on the predictive occupant environmental preferences.

Non-Environmental Parameter Feedback Setpoint Geofence (t)—control engine yields a predictive multi-dimensional (at least two, preferably three) geofence model as a function of time based on the predictive occupant non-environmental preferences.

Light Parameter Feedback Setpoint Geofence (t)—control engine yields a predictive multi-dimensional (at least two, preferably three) geofence model as a function of time based on the predictive occupant lighting preferences and/or regulatory requirements.

One exemplary sequential event driven implementation of the inventive control system is as follows: 1) Utilize predictive weather to determine external environmental load (t) on DMS; 2) Utilize predictive internal loads impacting environmental load (t) on DMS; 3) Aggregate external and internal environmental load (t) on DMS; 4) Determine optimal operations of stationary environmental assets to meet aggregate external and internal environmental load (t); 5) Determine shortfall of stationary environmental assets (t) in which DMAs must supplement, creating an environmental demand on DMA (t); 6) Determine optimal placement of DMA to meet environmental demand on DMA (t); 7) Determine electrical load demand of DMA (t) required to meet environmental demand on DMA (t); 8) Determine adequacy of onboard electrical energy storage based on current placement of DMA to meet environmental demand on DMA (t); 9) Determine availability of Service DMAs to ensure adequate delivery of additional electrical energy storage to meet environmental demand on DMA (t); 10) Determine shortfall of current placement of DMA to meet environmental demand on DMA (t), and whether additional environmental DMAs are available to address gap between supply and demand; 11) Determine shortfall of current placement of DMA to meet environmental demand on DMA (t), and whether additional electrical energy storage DMAs are available to address gap between supply and demand; 12) If shortfall continues to exist, determine a new optimal placement position for current placement of DMA and scheduled movement for each DMA that requires movement to meet environmental demand on DMA (t); 13) Control operations of each DMA particularly in view of onboard electrical energy storage sufficient to execute comfort and safety within environmental requirements (t); 14) Operate each DMA and stationary asset based on feedforward portion of control system, which effectively limits the power consumption through first electrically connected to stationary assets, then to effectively limits of power consumption through first electrically connected to onboard electrical energy storage, and then based on feedback portion of control system to specific environmental parameter based on differential of current state and parameter setpoint; 15) Project electrical demand (t) based on aggregate of external and internal environmental load (t); 16) Utilize predictive non-environmental electrical load on DMS.; 17) Aggregate electrical environmental and electrical non-environmental demand (t) on DMS; and 18) Determine optimal placement of DMAs taking into account stationary environmental and non-environmental assets.

Although the invention has been described in detail, regarding certain embodiments detailed herein, other anticipated embodiments can achieve the same results. Variations and modifications of the present invention will be obvious to those skilled in the art and the present invention is intended to cover in the appended claims all such modifications and equivalents.

What is claimed is:

1. A reconfigurable distributed energy system comprising: a reconfigurable building structure having an at least two-dimensional tributary load capacity, an at least two-dimensional dead load capacity, an at least two-dimensional safe egress geofence, an electrical power distribution system comprised of an at least one stationary energy consuming asset and an at least one repositionable energy consuming asset having a first energy storage system with a current energy storage capacity and an energy transfer port in energy flow communication with the first energy storage system, and an asset movement control system to coordinate the movement of the at least one repositionable energy consuming asset; wherein the at least one repositionable energy consuming asset is moved from a first location having a first position on the reconfigurable building structure and a first orientation on the reconfigurable building structure to a second location having a second position on the reconfigurable building structure and a second orientation on the reconfigurable building structure; whereby the asset movement control system calculates a total at least two-dimensional tributary load on the reconfigurable building structure and a total at least two-dimensional dead load on the reconfigurable building structure; whereby the asset movement control system then moves the at least one repositionable energy consuming asset from the first location to the second location after validating that the total at least two-dimensional tributary load does not exceed the at least two-dimensional tributary load capacity of the reconfigurable building structure, after validating that the total at least two-dimensional dead load does not exceed the at least two-dimensional dead load capacity of the reconfigurable building, after validating that the second location of the at least one repositionable energy consuming asset remains within the at least two-dimensional safe egress geofence while performing an operating task and also while having an energy inflow through the transfer port of the at least one repositionable energy consuming asset to increase the current energy storage capacity.

2. The reconfigurable distributed energy system according to claim 1, further a first repositionable energy consuming service asset having a first energy storage system, wherein the first energy storage system has a stored energy capacity in excess of energy required to move from a first location of the first repositionable energy consuming service asset to the second location of the at least one repositionable energy consuming asset and then to a second location of the first repositionable energy consuming service asset and in excess of energy required to provide the energy inflow to the at least one repositionable energy consuming asset, and wherein the asset movement control system calculates a first scheduled time during which the at least one repositionable energy consuming asset has the energy inflow from the first repositionable energy consuming service asset.

3. The reconfigurable distributed energy system according to claim 1, whereby the at least one stationary energy consuming asset is a ballasted energy consuming asset and wherein the ballasted energy consuming asset is below a center of gravity of the at least one stationary energy consuming asset.

4. The reconfigurable distributed energy system according to claim 3, whereby the ballasted energy consuming asset is at least one of a ballasted furniture, a ballasted environmental asset, a nested seat, a ballasted light fixture, a ballasted speaker, a ballasted noise reduction asset, or a nested table.

5. The reconfigurable distributed energy system according to claim 3, whereby the ballasted energy consuming asset is a wall panel or a panelized device.

6. The reconfigurable distributed energy system according to claim 5, whereby the wall panel or the panelized device is further comprising an at least one thermal energy storage system in the instance where the first energy storage system is an electrical energy storage system, and an exterior radiant surface whereby the exterior radiant surface is in thermal communication with either the at least one thermal energy storage system in the instance where the first energy storage system is the electrical energy storage system or the first energy storage system.

7. The reconfigurable distributed energy system according to claim 1, after validating that the second location of the at least one repositionable energy consuming asset remains within an at least two-dimensional environmental geofence during an entire time duration in which the at least one repositionable energy consuming asset remains in the second location while performing an operating environmental task.

8. The reconfigurable distributed energy system according to claim 1, whereby the at least one repositionable energy consuming asset is further comprising an at least one thermal energy storage system and wherein the first energy storage system is an electrical energy storage system, and an electrical airflow motor powered by the electrical energy storage system and whereby the electrical powered airflow motor emits an airflow in thermal communication with the at least one thermal energy storage system to modulate an environmental parameter for a controlled atmosphere space in approximately immediate vicinity of the first position of the energy consuming asset.

9. The reconfigurable distributed energy system according to claim 1, whereby the at least one repositionable energy consuming asset is further comprising an at least one thermal energy storage system and wherein the first energy storage system is an electrical energy storage system, an electrical airflow motor and an electrical compressor motor are both powered by the electrical energy storage system, whereby the electrical compressor motor compresses a thermodynamic working fluid through both a high-pressure side heat exchanger and a low-pressure side heat exchanger, wherein the high-pressure side heat exchanger has a high-side operating pressure of at least 2 psi greater than a low-side operating pressure of the low-pressure side heat exchanger; and whereby the at least one thermal energy storage system is in thermal communications with low-pressure side heat exchanger when the electrical airflow motor emits an airflow in thermal communication with the high-pressure side heat exchanger to modulate an environmental parameter for a controlled atmosphere space in approximately immediate vicinity of the first position of the energy consuming asset or whereby the at least one thermal energy storage system is in thermal communications with high-pressure side heat exchanger when the electrical airflow motor emits an airflow in thermal communication with the low-pressure side heat exchanger to modulate an environmental parameter for a controlled atmosphere space in approximately immediate vicinity of the first position of the energy consuming asset.

10. The reconfigurable distributed energy system according to claim 9, further comprised of an environmental control system to modulate the environmental parameter for the controlled atmosphere space, whereby the environmental parameter has an environmental parameter setpoint and an environmental parameter energy limit setpoint, whereby operating at the environmental parameter energy limit setpoint reduces energy consumption by at least one percent lower than when operating at the environmental parameter setpoint, whereby the environmental control system has a feedforward control loop to limit a real-time energy consumption on the at least one repositionable energy consuming asset based on a real-time energy consumption of the reconfigurable building structure, a predicted aggregate energy consumption of the reconfigurable building structure, a real-time energy consumption of the at least on repositionable energy consuming asset, or a predicted aggregate energy consumption of the at least on repositionable energy consuming asset to calculate and then modulate the environmental parameter energy limit setpoint to an energy modulated environmental parameter energy limit setpoint, and a feedback control loop to minimize the differential of a real-time environmental parameter within the controlled atmosphere space and the energy modulated environmental parameter energy limit setpoint.

11. The reconfigurable distributed energy system according to claim 1, further comprised of an at least one additional repositionable energy consuming asset is moved from a first location having a first position on the reconfigurable building structure and a first orientation on the reconfigurable building structure to a second location having a second position on the reconfigurable building structure and a second orientation on the reconfigurable building structure; whereby the asset movement control system calculates a total at least two-dimensional tributary load on the reconfigurable building structure and a total at least two-dimensional dead load on the reconfigurable building structure; whereby the asset movement control system then moves the at least one additional repositionable energy consuming asset from the first location to the second location after validating that the total at least two-dimensional tributary load does not exceed the at least two-dimensional tributary load capacity of the reconfigurable building structure, after validating that the total at least two-dimensional dead load does not exceed the at least two-dimensional dead load capacity of the reconfigurable building, after validating that the second location of the at least one repositionable energy consuming asset and the at least one additional repositionable energy consuming asset remains within the at least two-dimensional safe egress geofence while performing an operating task and also while having an energy inflow through the transfer port of the at least one repositionable energy consuming asset to increase the current energy storage capacity.

12. The reconfigurable distributed energy system according to claim 1, whereby the reconfigurable building structure has a digital twin comprises an at least one software module with an updated location of the at least one repositionable energy consuming asset, whereby the digital twin utilizes both an at least one location sensor on the reconfigurable building structure and an at least one location sensor onboard of the repositionable energy consuming asset, and whereby at least one of the first location, second location, or a real-time location of the at least one repositionable energy consuming asset is calculated becoming a digital twin calculation location for each of the at least one repositionable energy consuming asset utilized to model a performance factor of the reconfigurable building structure in accordance to the at least one software module whereby the performance factor is a function of time further a function of time of an at least one external environmental parameter on the reconfigurable building structure and results in an at least one movement instruction to the asset movement control system to schedule the movement of the at least one repositionable energy consuming asset as a function of time.

13. A method of tracking variable states of a reconfigurable distributed energy system for controlling the reconfigurable distributed energy system in transient conditions by a control system comprised of an at least two energy storage systems, whereby a first energy storage system is on a first repositionable operating task energy consuming asset and a second energy storage system is on a second repositionable operating task energy consuming asset with the method comprising: obtaining in a processor of a control system input data representative of the at least two energy storage systems comprising at least a first energy transmission segment and a second decoupled power transmission segment with each decoupled power transmission having an energy consumer in energy communications with the decoupled energy storage system; calculating via the processor an energy flux of each decoupled power transmission segment based on an input data of a current sensor and a voltage sensor; calculating via the processor an energy storage charge or discharge rate for each of the at least two energy storage systems and energy consumption of each of the at least two energy consumers reference transient predicted energy flux based on an input data including historic data, calendar impact data, environmental data and weather data; calculating via the processor a feedforward variable based on the predicted energy flux of each decoupled power transmission segment and an aggregate energy distribution of the each decoupled power transmission segment; obtaining in the processor a feedback variable and determining via the processor a control variable based on a multivariable coupled combination of the feedforward variable and a feedback variable based on a real-time current and a real-time voltage for each decoupled power transmission segment relative to a maximum current threshold and a maximum voltage threshold of the each decoupled power transmission segment; wherein determining the control variable based on the multivariable coupled combination of the feedforward variable and the feedback variable is calculated by a discretized dynamic equation with control of each energy consumer in energy communications with the decoupled energy storage system and the energy storage charge or discharge rate for each of the at least two energy storage systems, wherein the discretized dynamic equation comprising feedforward response, feedback response, aggregate energy distribution as a function of time, individual and aggregate stored energy state of each of the at least two energy storage systems, open loop scheduled energy consumers, disturbances generated by the open loop scheduled energy consumers; wherein the control system contemporaneously controls operation of the decoupled energy storage system based on the control variable.

14. The method of claim 13, further including disturbance rejection to attenuate effects of an at least one uncontrolled energy consumers.

15. The method of claim 13, further including disturbance rejection to attenuate effects of an at least one uncontrolled environmental data and weather data.

16. The method of claim 13 wherein obtaining input data includes obtaining data representative of an at least one power generation generator in an interconnected grid or micro-grid.

17. The method of claim 13, wherein calculating a location of the at least two energy storage systems relative to either the first decoupled power transmission segment or the second decoupled power transmission segment.

18. The method of claim 13, wherein calculating a location of the at least two energy storage systems relative to an at least two-dimensional environmental geofence during an entire time duration in which the repositionable operating task energy consuming asset remains at the location of the at least two energy storage systems while performing an operating environmental task.

19. The method of claim 18 further comprising modulating the energy flux of each decoupled power transmission segment based on an input data of a current sensor and a voltage sensor and the control variable to provide multivariable feedback control loop dynamic tuning as the control system contemporaneously controls operation of the reconfigurable distributed energy system to achieve a setpoint within the at least two-dimensional environmental geofence.

20. The method of claim 13, wherein calculating a location of the at least two energy storage systems relative to an at least two-dimensional safe egress geofence during an entire time duration in which the repositionable operating task energy consuming asset remains at the location of the at least two energy storage systems while performing an operating environmental task.

\* \* \* \* \*